(12) United States Patent
Boggs et al.

(10) Patent No.: US 10,594,722 B2
(45) Date of Patent: *Mar. 17, 2020

(54) METHODS, SYSTEMS AND MEDIA FOR EVALUATING LAYERED COMPUTER SECURITY PRODUCTS

(71) Applicant: The Trustees of Columbia University in the City of New York, New York, NY (US)

(72) Inventors: Nathaniel Gordon Boggs, New York, NY (US); Salvatore J. Stolfo, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,427

(22) Filed: Jul. 27, 2018

(65) Prior Publication Data

US 2019/0190943 A1 Jun. 20, 2019

Related U.S. Application Data

(63) Continuation of application No. 14/083,327, filed on Nov. 18, 2013, now Pat. No. 10,069,854.

(Continued)

(51) Int. Cl.
*H04L 29/06* (2006.01)
*H04L 9/08* (2006.01)
*H04L 12/26* (2006.01)

(52) U.S. Cl.
CPC .......... *H04L 63/1433* (2013.01); *H04L 9/08* (2013.01); *H04L 63/1416* (2013.01);
(Continued)

(58) Field of Classification Search
CPC ... H04L 63/1433; H04L 9/08; H04L 63/1425; H04L 63/1491; H04L 63/1416; H04L 43/028; G06F 17/30864; G06F 17/3053
See application file for complete search history.

(56) References Cited

U.S. PATENT DOCUMENTS 7,761,345 B1 * 7/2010 Martin ................. G06Q 10/087
 705/26.1
8,060,936 B2 * 11/2011 Mahaffey .............. G06F 21/577
 713/188

(Continued)

OTHER PUBLICATIONS

Commercial Antivirus Software Effectiveness: An Empirical Study, Published by the IEEE Computer Society, Mar. 2011 (Year: 2011).*

(Continued)

*Primary Examiner* — Meng Li
(74) *Attorney, Agent, or Firm* — Byrne Poh LLP

(57) ABSTRACT

Methods, systems and media for evaluating layered computer security products are provided. In some embodiments, the method comprises: (a) identifying portions of attack data associated with an attack; (b) linking the portions of attack data; (c) testing security products using the linked attack data, at least two of the security products using different portions of the linked attack data; (d) storing the results of the testing; (e) repeating (a)-(d) for multiple attacks; receiving information identifying a subset of the security products from a remote computing device; identifying a first set of detected attacks for each of the plurality of security product using the stored results; determining a number of attacks in a union of each of the first sets of identified attacks; determining a detection rate for the identified security products based on the union and the number of tested attacks; and causing the detection rate to be presented.

24 Claims, 7 Drawing Sheets

Related U.S. Application Data

(60) Provisional application No. 61/727,693, filed on Nov. 17, 2012.

(52) U.S. Cl.
CPC ...... *H04L 63/1425* (2013.01); *H04L 63/1491* (2013.01); *H04L 43/028* (2013.01)

(56) References Cited

U.S. PATENT DOCUMENTS

| | | | |
|---|---|---|---|
| 2005/0080720 A1* | 4/2005 | Betz | G06Q 40/08 705/38 |
| 2006/0085858 A1* | 4/2006 | Noel | H04L 63/1433 726/25 |
| 2006/0101263 A1* | 5/2006 | Costea | G06F 21/564 713/164 |
| 2012/0174227 A1* | 7/2012 | Mashevsky | G06F 21/562 726/24 |
| 2013/0160131 A1* | 6/2013 | Madou | G06F 11/3688 726/25 |

OTHER PUBLICATIONS

Bowen, B. et al., "Measuring the Human Factor of Cyber Security", In Technologies for Homeland Secuity (HST) 2011 IEEE International Conference on, Nov. 2011, pp. 230-235.

Bowen, B.M. et al., "Baiting Inside Attackers using Decoy Documents", In SecureComm series, Lecuter Notes of the Institute for Computer Sciences, Social Informatics and Telecommunications Engineering, vol. 19, Springer, Sep. 2009, pp. 51-70, available at: http://dx.doi.org/10.1007/978-3-642-05284-2.

Burr, W.E. et al., "Special Publication 800-63-1: Electronic Authentication Guideline", National Institute of Standards & Technology, Gaithersburg, MD, US, Technical Report, Dec. 2011, pp. 1-123.

Cavusoglu, H. et al., "A Model for Evaluating IT Security Investments", In Communications of the ACM, vol. 47, No. 7, Jul. 2004; pp. 87-92, available at: http://doi.acm.org/10.1145/1005817.1005828.

Cova, M. et al., "Detection and Analysis of Drive-by-Download Attacks and Malicious JavaScript Code", In the Proceedings of the 19th International Conference on World Wide Web, Raleigh, NC, US, Apr. 26-30, 2010, pp. 281-290.

Dumitras, T. and Shou, D., "Towards a Standard Benchmark for Computer Security Research", In the Proceedings of the First Workshop on Building Analysis Datasets and Gathering Experience Returns for Security, Salzburg, AT, Apr. 2011, pp. 89-96, available at: http://doi.acm.org/10.1145/1978672.1978683.

Egele, M. et al., "Defending Browsers Against Drive-By Downloads: Mitigating Heap-Spraying Code Injection Attacks", In Proceedings of the 6th International Conference on Detection of Intrusions and Malware, and Vulnerability Assessment, Como, IT, Jul. 9-10, 2009, pp. 88-106.

Gallo, O. et al., "Metering for Exposure Stacks", In the Proceedings of the Eurographics Computer Graphics Forum, vol. 31, No. 2, May 2012, pp. 383-754.

Lee, W. et al., "Toward Cost-Sensitive Modeling for Intrusion Detection and Response", In Journal of Computer Security, vol. 10, No. 1/2, Jul. 2002, pp. 5-22.

Lippmann, R. et al., "Validating and Restoring Defense in Depth using Attack Graphs", In Military Communications Conference (MILCOM '06). Washington DC, US, Oct. 2006, pp. 1-10.

Lu, L. et al., "BLADE: an Attack-Agnostic Approach for Preventing Drive-by Malware Infections", In ACM Conference on Computer and Communications Security, Oct. 2010, pp. 440-450, available at: http://doi.acm.org/10.1145/1866307.1866356.

Notice of Allowance dated May 18, 2018 in U.S. Appl. No. 14/083,327.

Office Action dated May 27, 2016 in U.S. Appl. No. 14/083,327.

Office Action dated Oct. 5, 2017 in U.S. Appl. No. 14/083,327.

Office Action dated Oct. 21, 2016 in U.S. Appl. No. 14/083,327.

Pamula, J. et al., "A Weakest-Adversary Security Metric for Network Configuration Security Analysis", In the Proceedings of the 2nd ACM Workshop on Quality of Protection (QoP '06), New York, NY, US, Oct. 2006, pp. 31-38.

Roesch, M., "Snort: Lightweight Intrusion Detection for Networks", In the Proceedings of the 13th Conference on Systems Administration (LISA '99), Seattle, WA, US, Nov. 7-12, 1999, pp. 229-238.

Salem, M.B. et al., "Modeling User Search-Behavior for Masquerade Detection", In the Proceedings of the 14th International Symposium on Recent Advances in Intrusion Detection, Menlo Park, CA, US, Sep. 20-21, 2011, pp. 181-200.

Somayaji, A. et al., "Evaluating Security Products with Clinical Trials", In the Proceedings of the 2nd Conference on Cyber Security Experimentation and Test, USENIX Association, Aug. 2009, pp. 1-6.

Song, Y. et al., "On the Infeasibility of Modeling Polymorphic Shellcode", In the Proceedings of the 14th ACM Conference on Computer and Communications Security (CCS '07), New York, NY, US, Oct. 2007, pp. 541-551, available at: http://doi.acm.org/10.1145/1315245.1315312.

Stolfo, S. et al., "Measuring Security", In IEEE Security Privacy, vol. 9, No. 3, May/Jun. 2011, pp. 60-65.

Styz, M., "Considering Defense in Depth for Software Applications", In IEEE Security Privacy, vol. 2, No. 1, Feb. 2004, pp. 72-75.

Sukwong, O., et al. Commercial Antivirus Software Effectiveness: An Empirical Study, In publication of the IEE Computer Society, vol. 6, issue 3, Mar. 11, 2011, pp. 63-70.

Symantec, "Internet Security Threat Report, vol. 17 Main Report", Apr. 2012, pp. 1-52, available at: http://www.symantec.com/content/enterprise/other_resources/b-istr_main_report_2011_21239364.en-us.pdf.

The Center for Internet Security, "CIS Consensus Information Security Metrics", Nov. 2010, pp. 1-3, available at: http://www.cisecurity.org/metrics.html.

Watson, J., "Virtualbox; Bits and Bytes Masquerading as Machines", In Linux Journal, Feb. 1, 2008, pp. 1-11, available at: www.linuxjournal.com/article/9941?page=0,0.

Weir, M. et al., "Testing Metrics for Password Creation Policies by Attacking Large Sets of Revealed Passwords", In ACM Conference on Computer and Communications Security, Oct. 2010, pp. 162-175, available at: http://doi.acm.org/10.1145/1866307.1866327.

* cited by examiner

Each Slice represents an attack

Each Ring repsents one layer of defense

Detected   Missed

METHODS, SYSTEMS AND MEDIA FOR EVALUATING LAYERED COMPUTER SECURITY PRODUCTS

CROSS-REFERENCE TO RELATED APPLICATION

This application is a continuation of U.S. patent application Ser. No. 14/083,327, filed Nov. 18, 2013, which claims the benefit of U.S. Provisional Patent Application No. 61/727,693, filed Nov. 17, 2012, each of which is hereby incorporated by reference herein in its entirety.

STATEMENT REGARDING FEDERALLY SPONSORED RESEARCH OR DEVELOPMENT

This invention was made with government support under Grant No. FA9550-12-1-0162 awarded by the Air Force Office for Scientific Research (AFOSR). The government has certain rights in the invention.

TECHNICAL FIELD

The disclosed subject matter relates to methods, systems and media for evaluating layered computer security products.

BACKGROUND

Computer network attackers continually innovate and craft attacks to penetrate existing computer network defenses. New security product purchasing decisions are often key in order to keep the computer networks of organizations as secure as possible. Current information available to inform these decisions is limited to individual security product detection rates for some test set of attacks. Actual security performance, however, depends on how a security product performs in the context of an organization's existing security products. Even a security product that tests well on its own may be completely redundant or provide very little benefit when actually deployed into an existing environment. Metrics generated by even the best current tests fail to measure the gain of attack detection using the new security product with regard to existing layers of security. This leaves those making key purchasing unable to accurately determine how each potential security solution will actually affect an organization's overall security.

Therefore, there is a need for methods, systems, and media for evaluating layered computer security products.

SUMMARY

In accordance with various embodiments of the disclosed subject matter, methods, systems, and media for evaluating layered computer security products are provided.

In accordance with some embodiments of the disclosed subject matter, a method for evaluating layered security products, the method comprising: (a) identifying, using at least one hardware processor, a plurality of portions of attack data associated with an attack; (b) linking, using the at least one hardware processor, the plurality of portions of attack data to the attack; (c) testing, using the at least one hardware processor, a plurality of security products using the linked attack data of the attack, wherein at least two of the security products use different portions of the linked attack data to detect the attack; (d) storing, using the at least one hardware processor, the results of the testing in association with the information identifying the attack; (e) repeating, using the at least one hardware processor, (a)-(d) for a plurality of attacks; receiving, using the at least one hardware processor, information identifying a subset of the plurality of security products from a remote computing device; identifying, using the at least one hardware processor, for each of the plurality of security products, a first set of detected attacks detected by the security product from the plurality of tested attacks using the stored results; determining, using the at least one hardware processor, a number of attacks in a union of each of the first sets of identified attacks; determining, using the at least one hardware processor, a detection rate for the plurality of security products by comparing the first number of attacks to the number of attacks in the plurality of tested attacks; and causing, using the at least one hardware processor, the detection rate to be presented to on a display coupled to the remote computing device.

In accordance with some embodiments, a system for evaluating layered security products is provided, the system comprising: at least one hardware processor programmed to: (a) identify a plurality of portions of attack data associated with an attack; (b) link the plurality of portions of attack data to the attack; (c) test a plurality of security products using the linked attack data of the attack, wherein at least two of the security products use different portions of the linked attack data to detect the attack; (d) store the results of the testing in association with the information identifying the attack; (e) repeat (a)-(d) for a plurality of attacks; receive information identifying a subset of the plurality of security products from a remote computing device; identify for each of the plurality of security products, a first set of detected attacks detected by the security product from the plurality of tested attacks using the stored results; determine a number of attacks in a union of each of the first sets of identified attacks; determine a detection rate for the plurality of security products by comparing the first number of attacks to the number of attacks in the plurality of tested attacks; and cause the detection rate to be presented on a display coupled to the remote computing device.

In accordance with some embodiments of the disclosed subject matter, a non-transitory computer-readable medium containing computer executable instructions that, when executed by a processor, cause the processor to perform a method for evaluating layered security products is provided, the method comprising: (a) identifying a plurality of portions of attack data associated with an attack; (b) linking the plurality of portions of attack data to the attack; (c) testing a plurality of security products using the linked attack data of the attack, wherein at least two of the security products use different portions of the linked attack data to detect the attack; (d) storing the results of the testing in association with the information identifying the attack; (e) repeating (a)-(d) for a plurality of attacks; receiving information identifying a subset of the plurality of security products from a remote computing device; identifying for each of the plurality of security products, a first set of detected attacks detected by the security product from the plurality of tested attacks using the stored results; determining a number of attacks in a union of each of the first sets of identified attacks; determining a detection rate for the plurality of security products by comparing the first number of attacks to the number of attacks in the plurality of tested attacks; and causing the detection rate to be presented on a display coupled to the remote computing device.

In some embodiments, the method further comprises identifying at least one additional security product not included in the subset of the plurality of security products and that detected at least one attack of the plurality of tested attacks that is not included in any of the first sets of attacks; identifying for the at least one additional security product, a second set of attacks detected by the at least one additional security product from the plurality of tested attacks; determining a second number of attacks in a second union of each of the first union of identified attacks and the second set of identified attacks; determining an updated detection rate for the plurality of security products and the at least one additional security products by comparing the second number of attacks to the number of attacks in the plurality of tested attacks; and causing the updated detection rate to be presented on the display.

In some embodiments, the method further comprises ranking the plurality of additional security products, including the at least one additional security product, based at least in part on a number of attacks in a union of attacks detected by each of the plurality of additional security products and attacks in the first union.

In some embodiments, the method further comprises causing at least one of the plurality of additional security products to be presented in an order determined based on the ranking.

In some embodiments, the method further comprises: receiving a budget from the remote computing device; and wherein identifying the at least one additional security product is based on an estimated cost of the at least one addition security product and the budget.

In some embodiments, the method further comprises causing a graphical representation of attacks from the plurality of tested attacks detected by each of the subset of the plurality of security products to be presented on the display coupled to the remote computing device.

In some embodiments, the method further comprises determining attacks from the plurality of tested attacks detected by at least two of the subset of the plurality of security products.

In some embodiments, identifying a first set of attacks detected by the security product comprises: querying a database of tested attack data for each of the plurality of security products, wherein the database includes the stored results; and receiving the first set of attacks detected by each of the subset of the plurality of security products in response to the query.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
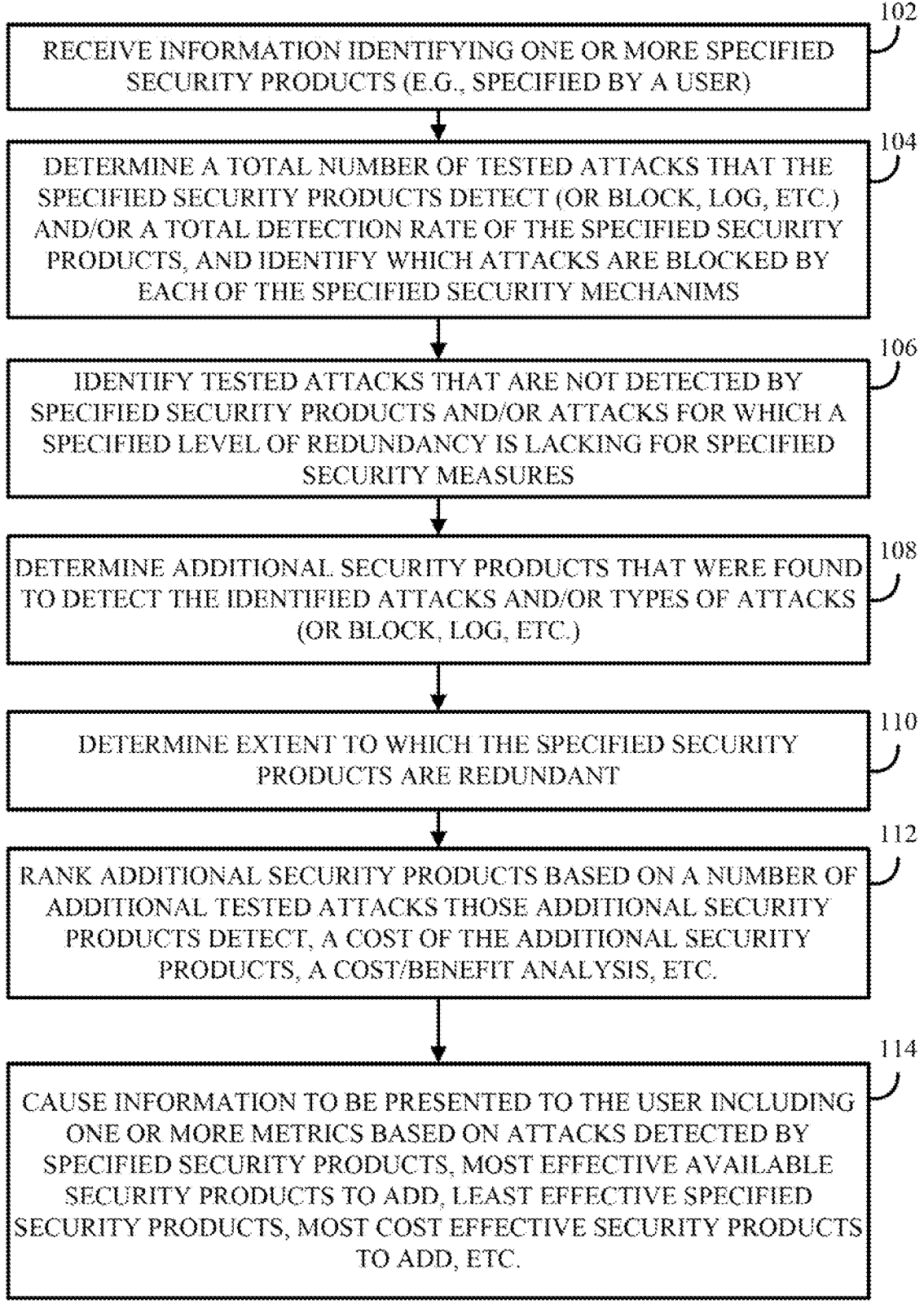
FIG. 1 shows an example of a process for evaluating layered computer security products in accordance with some embodiments of the disclosed subject matter.

In accordance with various embodiments, mechanisms (which can include methods, systems, and/or media) for analyzing layered computer security products are provided.

In some embodiments, the mechanisms described herein can receive information specifying security products/techniques from a user such as a chief technology officer of a company. The mechanisms can receive information specifying any suitable security products/techniques. For example, the mechanisms can receive information identifying tangible security products/techniques such as antivirus software and/or intangible security products/techniques such as educating users to recognize spam emails. Although the mechanisms described herein are generally described in connection with computer network security products, this is not intended to be limiting, and the mechanisms can be used with any suitable security product and/or security techniques such as user education or limiting the privileges of users to make changes to the computer network and/or devices on the network.

In some embodiments, the mechanisms described herein can query a database that includes data on which security products, if any, detected each of various tested attacks. For example, the mechanisms described herein can query the database for each of the specified security products to determine which of the tested attacks each security product detected, and can use this information to determine a proportion of all tested attacks that were detected by the specified security products. In a more particular example, the mechanisms described herein can receive information from a user specifying a particular antivirus product, a particular intrusion detection system (IDS) and a particular firewall. The mechanisms can then query the database to determine which tested attacks were detected by each of these security products. The mechanisms can use the information returned from the database to determine how many of the tested attacks were detected by at least one of the antivirus product, the IDS and the firewall.

In some embodiments, the mechanisms described herein can use information about which attacks were detected by the specified security products to generate one or more recommendations for increasing the security of a computer system. For example, these recommendations can include a recommendation of which additional security product or products would increase the proportion of tested attacks that are detected. As another example, these recommendations can include a recommendation of which additional security products would increase the security of an entity that is currently using the specified security products.

In some embodiments, the mechanisms described herein can test various security products against various attack data, and can use the results of such testing to create and/or update a database of tested attack data. For example, the mechanisms can gather attack data from malicious spam emails and test an antivirus product, a domain reputation product, and a firewall using the attack data. The mechanisms can determine whether the attack was detected by each of these products and can log the results in the database.

Turning to FIG. 1, an example 100 of a process for evaluating layered computer security products is shown in accordance with some embodiments of the disclosed subject matter. Generally speaking, process 100 can operate as follow: First, in some embodiments, process 100 can receive information identifying one or more specified security products, at 102, and can determine a total number of tested attacks that the specified security products detect, at 104. Process 100 can identify tested attacks that are not detected by the specified security products, at 106, and can determine additional security products that detected at least a portion of the attacks that are not detected by the specified security products, at 108, in some embodiments. Additionally, in some embodiments, process 100 can determine an extent to which the specified security products are redundant (e.g., detect an overlapping set of attacks), at 110. In some embodiments, process 100 can rank additional security products based on a number of additional attacks that the additional security product detect (e.g., compared to the specified security products), at 112. In some embodiments, at 114, process 100 can cause one or more security metrics to be presented to a user that may be indicative of a proportion of attacks that are detected by the specified security mechanisms. Additional or alternatively, at 114, process 100 cause information about additional security mechanisms to be adopted that detect attacks that were not detected by the specified security products.

More particularly, at 102, process 100 can receive information identifying one or more specified security products. Any suitable technique or techniques can be used to receive the information identifying the one or more security products. For example, the information can be received by a computing device, such as a server executing process 100, over a network from a computing device used to specify particular security products. As another example, the information can be received by a computing device executing process 100 that is also used to specify particular security products.

Any suitable technique or techniques can be used to specify security products to be evaluated using process 100, in some embodiments. For example, a user, such as a representative of an entity (e.g., a corporation, a non-profit entity, a household, etc.), can specify security products that are currently being used by the entity. As another example, a user can initiate any suitable process for automatically detecting security products that are currently being used by the entity. As yet another example, a combination of automatic detection and selection by a user can be used to specify security products to be evaluated using process 100. As still another example, a user interface and/or a process can be used to guide a user through specifying which security products are currently being used by the entity.

A user interface for specifying security products can be presented using any suitable technique or techniques, in some embodiments. For example, the one or more specified security products can be specified by a user of a user interface presented on a computing device, such as a personal computer, laptop computer, tablet computer, smartphone, wearable computer, etc. This user interface can be presented as part of a web site for evaluating computer security products, as part of an application for evaluating computer security products, or using any other suitable technique or techniques.

Any suitable level of detail can be included in information specifying a particular security product. For example, a name or other identifying information of the security product can be included in the information specifying a particular security product. As another example, a description of the security product can be included in the information specifying a particular security product. As yet another example, a version of a security product can be included in the information specifying a particular security product. As still another example, information on when the security product was last updated can be included in the information specifying a particular security product.

In some embodiments, process 100 can also receive information specifying hardware and/or software associated with the entity that the specified security products are protecting. For example, process 100 can receive information specifying one or more operating systems used by the entity. As another example, process 100 can receive information specifying one or more email clients used by the entity. As yet another example, process 100 can receive information specifying one or more products used in the entity's network such as specific types and/or models of routers, servers, switches, personal computers, and/or any other hardware used in the network by the entity. In some embodiments, certain hardware and/or software that is not a traditional security product can include security features that can detect attacks and/or prevent attacks from working against a device using that hardware and/or software. For example, an operating system can include security features that may prevent an attack from working against a device running the operating system and/or can detect the attack. As another example, certain email clients can include security features, such as spam filters that can prevent attacks from being forwarded to a user's email. Accordingly, in some embodiments, software and/or hardware specified by the user at 102 as being software and/or hardware associated with the entity that the specified security products are protecting can also be considered security products.

At 104, process 100 can determine a total number of attacks that the specified security products detect. In some embodiments, the total number of attacks that the specified security products detect can be determined by identifying which attacks from a set of tested attacks were detected by each specified security product and/or by identifying which attacks from the set of tested attacks were not detected by any of the specified security products. In some embodiments, the union of the attacks detected by each specified security product can be found to determine which attacks were detected by a group of the specified security products. In some embodiments, process 100 can determine a total detection rate based on the total number of attacks detected by the specified security products and the total number of tested attacks. For example, the total detection rate can be determined as a percentage of the tested attacks that are included in the union of attacks detected by each of the security products. In some embodiments, a detection rate of each of the security products can be determined using any suitable technique or techniques, such as techniques described below in connection with FIG. 4.

In some embodiments, the total number of attacks that were detected by a particular security product can include real-time and/or near real-time information that is periodically and/or continuously updated. This updating can be performed using any suitable technique or techniques, in some embodiments. For example, testing, such as testing described below in connection with FIG. 4, can be used to perform this updating and the testing can be ongoing and/or can continually test new potential attacks against various security products. Data on which attacks are detected by a particular security product can be updated whenever new data becomes available and/or at any other suitable time. In some embodiments, process 100 (or other mechanisms described herein) can use the information on the number of detected attacks to determine a detection rate based on which attacks a particular security product detected in real-time or near real-time. In some embodiments, process 100 can also determine a logging rate, or any other suitable information about which attacks are in some way recognized by the specified security products.

Additionally or alternatively, any other measure of the specified security products can be determined at 104. For example, a false positive rate of each the specified security products can be determined, and an overall false positive rate for a group of the specified security products can be determined. In some embodiments, false positives for each security product can be determined using any suitable techniques, such as techniques described below in connection with FIG. 4. In a more particular example, the false positive rate can be based on a number of non-attack events that were detected as being attacks by a security product and the total number of non-attack events exposed to the security product. Such events can be categorized and/or parsed using any suitable techniques (e.g., in order to determine what constitutes one non-attack event, to determine how many non-attack events were tested, etc.)

As another example, the total number of attacks that the specified security products log can be determined by determining which attacks from a set of tested attacks are logged by each specified security product and/or determining which attacks from the set of tested attacks are not logged by any of the specified security products. In some embodiments, logging can include creating a report and/or alerting a user or administrator that an attack has been detected. In some embodiments, process 100 can determine a logging rate based on the total number of attacks logged by the specified security products and the total number of attacks from the set of tested attacks. This logging rate can be determined as a percentage of the attacks from the set of tested attacks that are included in the union of attacks logged by each of the security products. In some embodiments, a logging rate of each of the security products can be determined using any suitable technique or techniques, such as techniques similar to those described below in connection with FIG. 4.

In some embodiments, the total detection rate can be expressed as a total detection metric that can be indicative of the security of the entity, if the entity is using the specified security products. This total detection metric can be based on the total number of attacks against which the specified security products have been tested. Techniques for testing various security products against such attacks are described below in connection with FIG. 4. In some embodiments, the total detection metric for a set of specified security products L, can be found by dividing a number of elements in a set T by a number of elements in a set A, where set T is the union of detected attacks by the set of security products L, and set A is the set of all attacks tested. In some embodiments, $S_i$ can be the set of attacks that security product i detects. For example, if a particular security product is a host-based antivirus product, then S for that product can be the set of executable files associated with the set of attacks A which were detected by the host-based antivirus product.

In some embodiments, a set N can be the set of all security products tested against at least some subset of attacks in set A, and each of the specified security products L can be a part of the set N. In some embodiments, some security products may not be tested against certain attacks. For example, a particular attack may not be tested against a particular security products if the attack is not detectable by the particular security product. In a more particular example, if an attack does not include the download of an executable file, then a host-based antivirus product may not be able to detect the attack. As another more particular example, if an attack includes delivery of an executable file using otherwise normal packets, then a network-based IDS that uses only a network packet header portion (that is, not a datagram portion of the packet) may not be able to detect the attack.

In some embodiments, $S_i$ can be expressed as a set of attacks x that satisfy the following conditions $\{x | x \in A \wedge x$ detected by security product $i \in N\}$. That is, x can be any attack for which x is an attack that is included in the set A and for which x is detected by security product i, which is a security product in the set of security products tested N. Additionally, in some embodiments, the set of detected attacks T can be expressed as the union of $S_j$, where each security product j is a member of the set L of specified security products.

Similarly, in some embodiments, other metrics that represent information about the specified security products can be determined based on any suitable data. For example, a total false positive metric can be determined based on false positive data for each security product. As another example, a total logging metric can be determined based on logging data for each security product. In some embodiments, process 100 can cause multiple metrics, such as a total detection metric, a total false positive metric, and/or any other suitable metrics to be presented to a user to provide additional information about a current security situation of an entity based on the specified security products.

Additionally or alternatively, process 100 can determine a redundant detection rate at 104 based on the number of attacks that are detected at a particular level of redundancy. For example, process 100 can determine which attacks are detected by at least two of the specified security products, at least three of the specified security products, etc. In some embodiments, a desired level of redundancy can be specified by a user, for example, by selecting a specified level of redundancy using, for example, the user interface for specifying the specified security products.

In some embodiments, process 100 can use information about different types of attacks and/or different levels of attack to present additional information to a user. Types of attacks can be based, for example, on a vector of the attack and/or how the attack accesses a computing device. For example, one type of attack can be a drive-by download attack in which an executable file is unintentionally downloaded and/or installed on a computing device. Such download and/or installation can be caused automatically without a user of the computing device initiating and/or approving the download and/or installation. Alternatively, the download and/or installation can be caused in response to a user action specifically initiating the download and/or installation and/or approving the download and/or installation (e.g., by using social engineering to trick the user into installing malware). As another example, another type of attack can be a web application attack in which an attacker can attempt to gain unauthorized access to data on a computing device, such as a server, through a web site or other user interface that used data from the server. In some embodiments, process 100 can identify each attack as corresponding to a particular type of attack. Additionally, in some embodiments, process 100 can cause information about detection of different attack types (or any other suitable recognition of an attack such as logging of the attack) to be presented to a user by specifying rates at which different types of attack are detected as well as which attacks (or which proportion of attacks) are detected.

In some embodiments, process 100 can classify attacks based on, for example, a threat level posed by the attack to a typical entity when determining information to be presented to the user. Such classification can be performed using any suitable technique or techniques such as techniques based on attack data used to test the attack. For example, attacks can be classified into a threat level such as attacks by widespread untargeted exploit kit attackers, attacks by targeted exploit kit attackers, attacks by zero day attackers, attacks by insiders, attacks by other more sophisticated attackers, and/or any other suitable threat level. In some embodiments, each attack can be identified as being a particular level of attack. Additionally, in some embodiments, process 100 can cause information about detection of different levels of attack to be presented to a user by specifying rates at which levels of attack are detected as well as which attacks (or which proportion of attacks) are detected.

In some embodiments, one level of attack classification can correspond to widespread untargeted exploit kit attackers. For example, attacks by a drive-by download attacker that makes general non-targeted attacks, but does so against any email address available can be considered to be a widespread untargeted exploit kit attackers.

In some embodiments, another level of attack classification can correspond to targeted exploit kit attackers. For example, such attackers may be capable of using available attack tools to a greater extent than an untargeted attacker and/or may be capable of making targeted attacks using various social engineering techniques and/or techniques that bypass certain types of security products (e.g., spam filters, reputation based domain filtering systems, etc.), such as spear-phishing or using new clean domains, in order to compromise higher value targets. In order to test against attacks by such attackers, in some embodiments, the mechanisms described herein can maintain up-to-date copies of widely available attack tools and exploit kits and use those tools and kits to generate attack data which can be used to test security products, such as when new exploits are added to the exploit kits before patches are made widely available.

In some embodiments, yet another level of attack classification can include attacks by more sophisticated attackers such as attackers that deploy zero-day exploits and/or attacks, insiders, or other more sophisticated attackers.

In some embodiments, process 100 can classify attacks based on, for example, a type or types of software and/or hardware that is the target of the attack and/or is susceptible to the attack. For example, an attack may target a particular operating system or version of operating system. In a more particular example, a particular attack may target the WINDOWS operating system available from MICROSOFT, while another attack may target MAC OS available from APPLE. In another more particular example, a particular attack may target the WINDOWS XP operating system from MICROSOFT, but not the WINDOWS 7 operating system. As another example, an attack may not specifically target a particular operating system, but certain operating systems may be more susceptible to the attack than other operating systems. Similarly, attacks can target certain email clients, certain web browsers, certain types of hardware, and/or any other hardware and/or software. Additionally or alternatively, certain hardware and/or software (such as certain email clients, certain web browsers, certain types of hardware) may be more susceptible to certain attacks than other hardware. In some embodiments, the specified security products themselves can be the target of attacks and process 100 can classify attacks that target security products as a particular type of attack.

At 106, process 100 can identify attacks that were tested and which were not detected by any of the specified security products. For example, the attacks that were not detected can be identified by removing from the set of all attacks A the set of detected attacks T which are detected by security products L. These undetected attacks can be expressed as a set of undetected attacks. In attacks that were not logged, etc., in addition to attacks that were not detected. Additionally or alternatively, process 100 can identify attacks that were tested and which were not detected at a particular level of redundancy (e.g., not detected by two different specified security products). In some embodiments, process 100 can also identify attacks that were tested and which were not detected by any of the specified security products for the hardware and/or software specified by the user, as described above in connection with 102.

At 108, process 100 can identify additional security products that detect at least a portion of the attacks identified at 106 as being attacks that were not detected by the specified security products. In some embodiments, process 100 can identify additional security products from the security products that have been tested but are not among the specified security products. Additionally, in some embodiments, process 100 can determine which of the security products that have been tested but are not among the specified security products detect, for example, at least one attack identified at 106 as being an attack that was not detected by the specified security products. Any suitable technique or techniques can be used to identify additional security products that detect at least a portion of the attacks identified at 106. For example, information related to various tested attacks (e.g., attacks in set A) and/or information on the various tested security products (e.g., security products in set N) can be stored in one or more databases. In some embodiments, process 100 can query such a database to determine which security products detected attacks identified at 106. For example, identifying information of attacks identified at 106 as being attacks that are not detected by the specified security products can be used as inputs of a database query, and the results can correspond to those security products that detected the inputted attacks.

Additionally or alternatively, in some embodiments, process 100 can determine, at 108, additional security products that detect a particular type of attack or particular type of attacker that is identified at 106 as being attack types or attacker types that were not detected by the specified security products and/or were not detected at a sufficiently high rate (e.g., a detection rate for the attack type or attacker type over a threshold detection rate). In some embodiments, process 100 can cause information about weaknesses in an entity's security profile to be presented to a user (e.g., at 114). This information about weaknesses can be based on, for example, the determination of which attack types or which attacker types are not detected at a sufficiently high rate (e.g., a threshold detection rate).

At 110, process 100 can determine an extent to which the security products specified at 102 are redundant. For example, process 100 can determine a redundant detection rate which can be indicative of a number of attacks that are detected by at least two (or any other suitable number) of the specified security products. Additionally, process 100 can determine a redundant detection rate for different attack types and/or different attacker types. For example, process 100 can determine a redundant detection rate for each attack type and/or each attacker type, which can indicate what percentage of a particular attack type was detected by at least two of the specified security products.

At 112, process 100 can rank the additional security products based on any suitable criteria. For example, in some embodiments, process 100 can rank the additional security products based at least in part on a number of additional attacks that would be detected if the additional security product were used in addition to the specified security products. In this example, the additional security products can be ranked based on how much the addition of the additional security product would increase a total detection metric determined, for example, at 104.

As another example, process 100 can rank the additional security products based at least in part on a cost (or estimated cost) of using and/or implementing the additional security product. For example, each security product can be associated with various cost information, such as the estimated cost of a license for software, an estimated cost for training (e.g., training information technology employees on how to use the security product, training non-information technology employees on how to use the security product, etc.), an estimated cost for installation and/or implementation of the security product, a cost associated with false positives generated by the additional security product, and/or any other suitable cost information. In some embodiments, a user can specify information to be used in determining an estimated cost for each security product, such as a number of licenses needed, a size of the entity, a for-profit or not-for-profit status of the entity, etc. This information can be used by process 100 in estimating the cost of the additional security products in some embodiments.

As yet another example, process 100 can rank the additional security products based at least in part on a cost/benefit value determined for each of the additional security products. For example, process 100 can compare a cost estimate of adopting an additional security product (e.g., as described above) to an expected benefit of adopting the additional security product. In determining the benefit of adopting the additional security product, process 100 can use a cost associated with each attack and a benefit determined based at least in part on the cost savings from preventing additional attacks (e.g., the additional attacks that would be prevented if the additional security product were adopted). The estimated costs and/or benefits of adopting the additional security product can then be used by process 100 to rank the additional security products, with a security product that provides the most value (e.g., a largest benefit/cost difference) being ranked the highest.

Additionally or alternatively, process 100 can rank the additional security products against the specified security products. For example, process 100 can determine which of the specified security products detects the fewest attacks, and can rank the additional security products based on how many additional attacks would be detected by replacing a particular specified security product with one of the additional security products. As another example, process 100 can determine which security product of the specified security products is the most costly security product (e.g., based on ongoing licensing costs, maintenance costs, costs associated with false positives, etc.) and which of the additional security products would provide the most additional value as a replacement for that specified security product.

In some embodiments, rates and/or metrics determined at 104 and/or rankings determined at 112 can be used by process 100 to provide comparisons of different security products based on the increased protection they may afford in the context of the specified security products.

Additionally, a level of redundancy or lack thereof determined at 106 and/or 110 can be used by process 100 in evaluating the specified security products and/or additional security products. In some cases, redundancy metrics can be determined by process 100 based on security products that are unlikely to be bypassed by similar changes to an attack. For example, if an attack would be detected by two signature based antivirus products, process 100 can determine that this may not provide effective redundancy as changing the signature could bypass both products. Accordingly, in some embodiments, process 100 can consider two security products to provide redundancy if the security products detect attacks using different techniques, such as by operating at different security layers (e.g., host-based antivirus, network based intrusion detection, URL reputation based systems, etc.).

In some embodiments, process 100 can also rank updated versions of software and/or hardware that may be less susceptible to attacks with the additional security products. For example, process 100 can determine how many attacks would be detected by the specified security products if the entity was using updated software rather than the specified software (e.g., specified at 102). In a more particular example, process 100 can determine how many more attacks would be detected if the entity were using the same security products but the entity were using the WINDOWS 7 operating system, rather than the WINDOWS XP operating system.

At 114, process 100 can cause information related to the specified security products and/or the additional security products to be presented to a user. In some embodiments, process 100 can cause one or more metrics based on attacks detected by the specified security products to be presented to the user, such as a total detection metric, a total false positive metric, a total logging metric, or any other suitable metrics. Additionally or alternatively, in some embodiments, process 100 can cause any other suitable information to be presented to the user. For example, process 100 can cause information related to the most effective additional security product or products to be presented to the user at 114. As another example, process 100 can cause information related to the least effective of the specified security products (e.g., a specified security product or products that detect the least number of attacks, are the most superfluous, etc.) to be presented to the user. As yet another example, process 100 can cause information related to an additional security product or products that would be most effective (e.g., would increase the detection rate the most) as a replacement for the least effective security product or products. As yet another example, process 100 can cause information related to the additional security product or products that would be most cost-effective to add to the specified security products to be presented to the user. As still another example, process 100 can cause information related to updated hardware and/or software that would most improve the detection rate to be presented to the user.

In some embodiments, process 100 can cause this information to be presented to the user as part of a graphical user interface for presenting such information. For example, the user interface can be part of a web site, such as a web site for evaluating computer security products, or a user interface that is presented as part of an application for evaluating computer security products, or using any other suitable technique or techniques. This user interface can be a user interface used to specify security products at 102, in some embodiments.

In some embodiments, process 100 can use any suitable technique for conveying the information to be presented at 114. For example, information can be conveyed using text, tables, graphics, images, sounds, and/or any other suitable technique for conveying information. For example, process 100 can cause a list and/or table to be presented to the user that includes metrics for the specified security products, such as a total detection metric, etc. As another example, process 100 can cause a list and/or table to be presented to the user that can include metrics that illustrate a security situation if specified additional security products were adopted in addition to and/or in place of the specified security products. Additionally, in such an example, process 100 can cause an additional security product that would be most effective (e.g., a security product that raises a particular metric the most) to be highlighted using any suitable technique or techniques.

Figure 2:
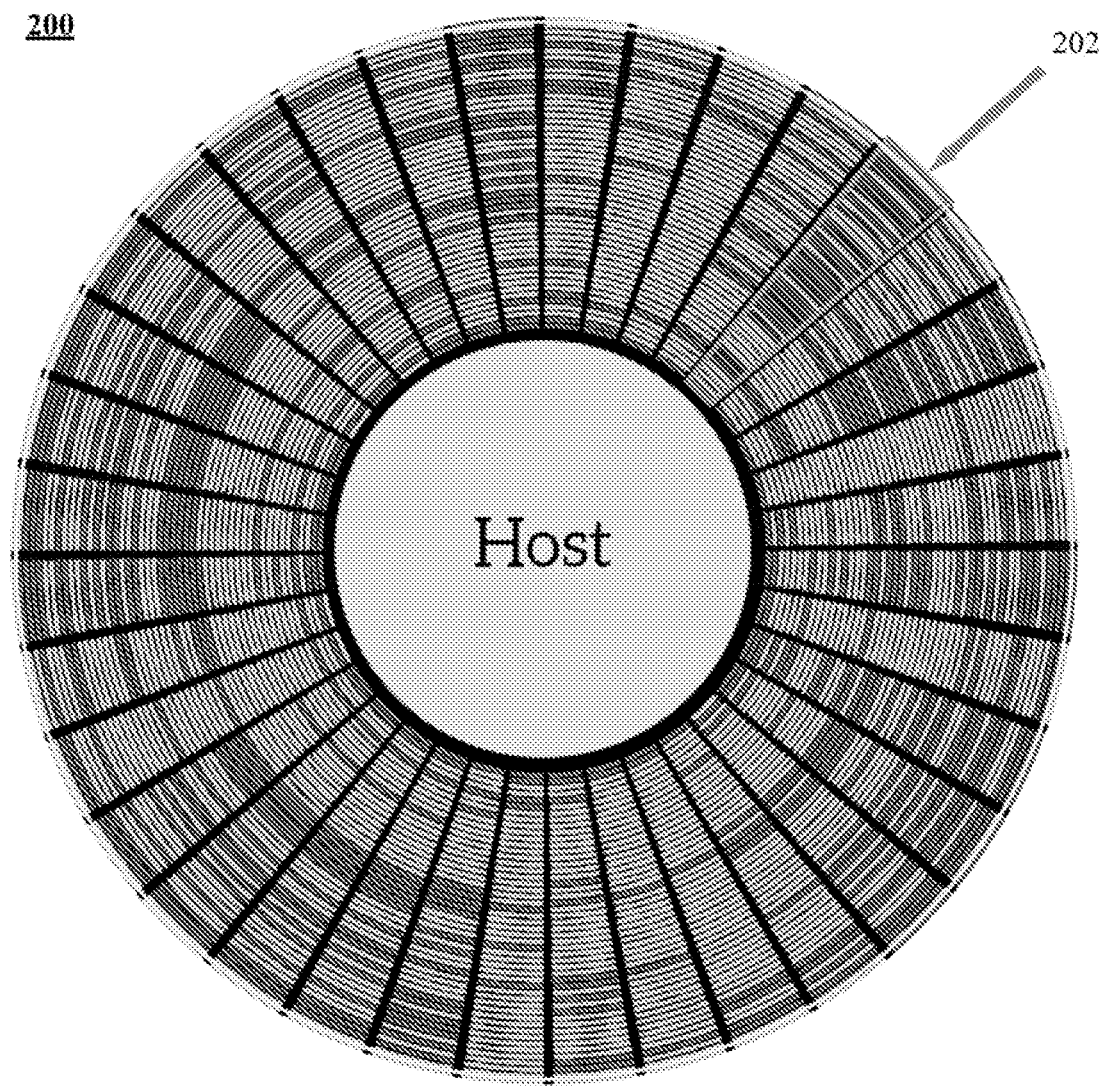
FIG. 2 shows an example of a chart that illustrates which attacks are detected by particular security products in accordance with some embodiments of the disclosed subject matter.
Figure 2:
Figure 2:
Figure 2:
Figure 2:

In some embodiments, process 100 can cause effectiveness of the specified security products and/or additional security products to be illustrated graphically. For example, FIG. 2 shows an example 200 of a chart that illustrates which attacks are detected by particular security products (e.g., layers of defense). As shown in FIG. 2, each tested attack can be presented as a "slice" 202 in the chart, and each security product can be presented as a "ring" in the chart. In some embodiments, process 100 (or any other suitable mechanisms) can represent that a particular security product detects a particular attack by shading the ring (or presenting the ring in a particular color) in a particular slice if the attack is detected. Process 100 (or any other suitable mechanisms) can represent that a particular security product does not detect a particular attack by not shading the ring (or presenting the ring in a different color). In some embodiments, this can be used by process 100 (or any other suitable process) to graphically present to a user an indication of how secure a host of the entity is with respect to the tested attacks. Additionally, process 100 can graphically convey that a host of an entity is vulnerable to an attack that none of the security products detect (e.g., none of the ring sections in a particular slice are shaded).

In some embodiments, process 100 can cause a graphical representation of the security of a host, such as chart 200 to be presented to the user for the specified security products, and any suitable additional security products. For example, process 100 can cause metrics indicative of how effective various additional security products would be if added to the specified security products (and/or by replacing one of the specified security products) to be presented to a user, and/or process 100 can cause a chart similar to chart 200 that also includes information about the additional security products to be presented to the user.

In some embodiments, process 100 can cause any suitable combination of information to be presented to the user. For example, process 100 can cause additional security products to be presented to the user along with information on effectiveness, marginal effectiveness, redundancy, cost, a cost/benefit calculation, and/or any other suitable information. In some embodiments, process 100 can receive a user selection one or more additional security products, and process 100 can recalculate metrics, graphs, charts, etc., taking into account the selected additional security products.

Process 100 can then cause these new values to be presented to the user, for example, in a side-by-side comparison with corresponding metrics, charts, tables, and/or any other suitable information, for the specified computer security products.

In some embodiments, process 100 can cause a recommended set of additional security products and/or updated software and/or hardware to be presented. Process 100 can cause these recommended security products to be presented as security products that would be most effective (e.g., increase one or more security metrics most) if added to the specified security products and/or as replacements for one or more of the security products. In making such recommendations, process 100 can take into account any suitable factors. For example, process 100 can take into account a budget. As another example, process 100 can take into account a cost of the additional security products. As yet another example, process 100 can take into account a specified total detection rate (e.g., specified by the user, specified in industry best practices, compliance rules etc.). As still another example, process 100 can take into account a specified level of redundancy (e.g., specified by the user, specified in industry best practices, compliance rules etc.). As a further example, process 100 can consider a combination of such factors and/or any other suitable factors. Process 100 can cause this recommended set of additional security products to be presented using any suitable technique or techniques and can be tailored to a particular situation specified by the user, by industry best practices, compliance rules, and/or any other suitable situation, in some embodiments.

In some embodiments, process 100 can cause information on how recently attack detection data was updated for the specified security products and/or the additional security products to be presented. For example, process 100 can cause information to be presented indicating that the attack data was updated within the last week, within the last day, within the last five minutes, or any other suitable timing information on when the attack data was updated.

Figure 3:
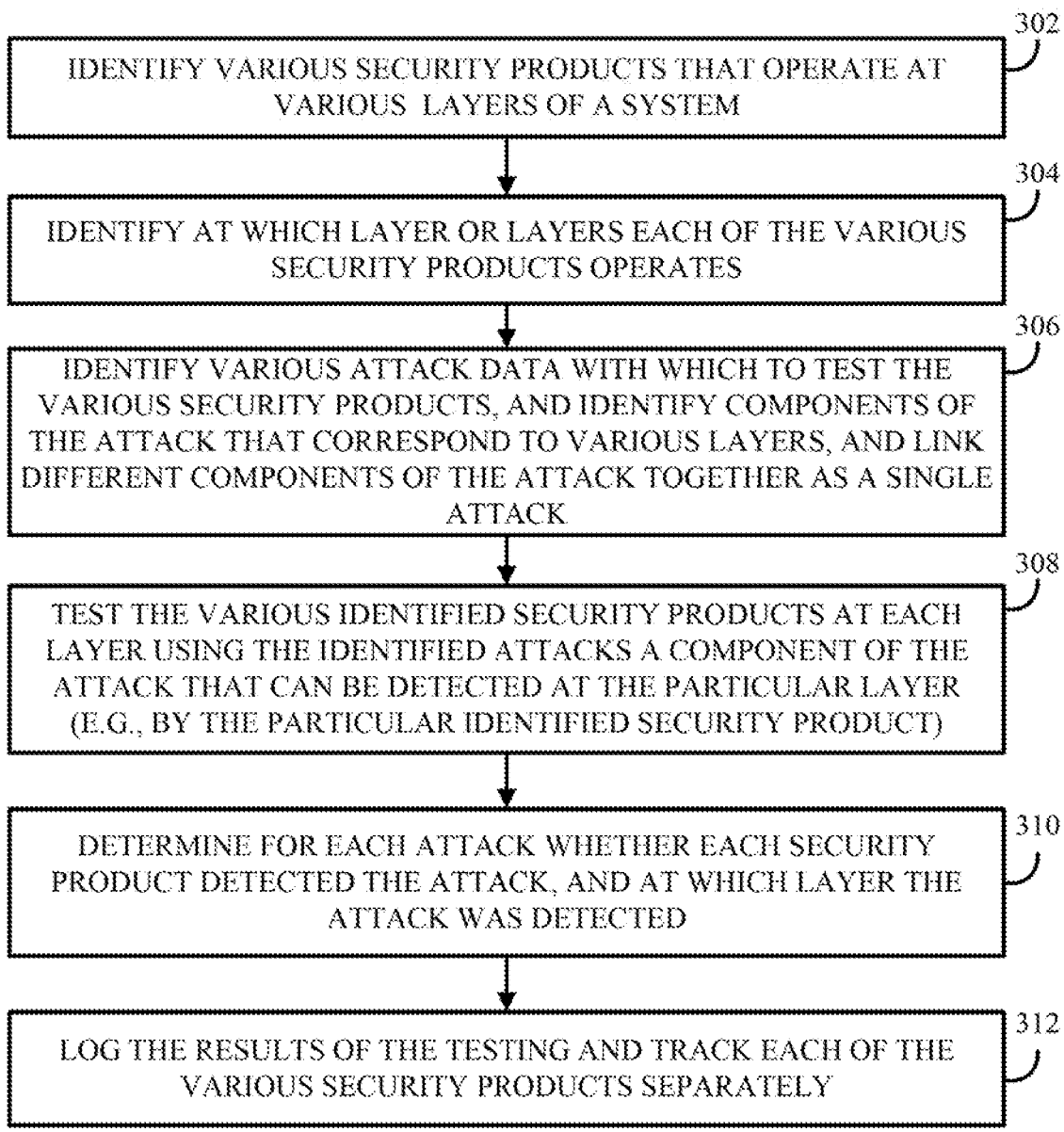
FIG. 3 shows an example of a process for testing various security products to generate data that can be used in evaluating layered computer security products in accordance with some embodiments of the disclosed subject matter.

FIG. 3 shows an example 300 of a process for testing various security products to generate data used in evaluating layered computer security products in accordance with some embodiments. At 302, process 300 can identify various security products that operate at various layers in a system. Any suitable security products can be identified that operate at any suitable layer of a system. For example, host-based antivirus products can operate at a layer of an individual computing device. As another example, host-based intrusion detection systems can also operate at a layer of an individual computing device. As yet another example, a URL reputation system or a firewall can operate at a layer corresponding to a point of entry of a network such as a local area network, wide area network, etc. As yet another example, an intrusion prevention system (IPS) can operate at a network layer of computing devices. In still another example, a network-based anomaly detector can operate at a network layer of computing devices. In a further example, training employees to better recognize malicious emails can operate at a user layer.

In some embodiments, each of the security products identified by process 300 can be implemented using any suitable techniques. For example, host-based security products can be installed and/or executed by individual machines, which can be either physical computing devices, virtual machines, or any other suitable machine. As another example, a service for testing various security products with a particular file (or other data that may be related to an attack) can be identified, and process 300 can submit data to such a service. Process 300 can then receive from the service an indication of whether the data was identified as being an attack (or some probability that the data is part of an attack) by each security product. As yet another example, a network-based security product can be executed by a computing device, such as a server, that receives network data as input and outputs a determination of whether the network data corresponds to an attack. As still another example, user training/education-based security products/techniques can be implemented by training a first set of users to, for example, better recognize phishing emails, and not training a second set of users. The rate at which the first users, for example, select malicious links in phishing emails can be compared to the rate at which the second set of users perform the same action. In some embodiments, process 300 can identify the various security products based on input from a user or administrator of a system for executing process 300.

At 304, process 300 can identify at which layer or layers each of the various security products identified at 302 operates. Additionally or alternatively, process 300 can determine what type of data the security product uses when detecting an attack. For example, a component of the attack used by each of the security products in detecting an attack can be identified. In a more particular example, for a drive-by download attack, different security products may use different information associated with the attack in determining whether an attack is detected. In this more particular example, process 300 can identify a particular layer at which each of these security products operates, and can identify data associated with a drive-by download attack that is used to detect an attack at that layer. For example, process 300 can determine that a URL reputation system can use a source URL associated with the drive-by download to determine whether the URL is suspicious and/or may be associated with an attack. As another example, process 300 can determine that a network-based anomaly detector can use network packets associated with the attack to determine whether the packets correspond to an attack. As yet another example, process 300 can determine that a spam filter can use a contents of an email to determine whether the email correspond to an attack.

In some embodiments, process 300 can identify at which layer or layers a security product operates and/or can identify which type of data a security product uses based on input from a user or administrator of a system for executing process 300 (e.g., using a graphical user interface). Additionally or alternatively, process 300 can identify at which layer or layers a security product operates and/or can identify which type of data a security product uses automatically using any suitable technique or techniques.

At 306, process 300 can identify data corresponding to various attacks which can be used to test the various security products identified at 302. Additionally, in some embodiments, process 300 can identify which components of the identified attack correspond to various layers and/or are used by the various security products in detecting an attack. In some embodiments, any suitable mechanisms can be used to identify attack data. In some embodiments, a manner in which attacks are identified can vary based on the type of attack. For example, different techniques can be used to collect data on drive-by download attacks and data on insider attacks. Accordingly, process 300 can first determine which type of attack data is to be collected, and depending on the attack type, can use any suitable technique or techniques to identify the attack data.

In some embodiments, process 300 can identify a particular attack type or vector. For example, process 300 can identify the particular attack type or vector based on input from a user or an administrator. As another example, process 300 can identify the particular attack type or vector automatically based on settings of a system for executing process 300. As yet another example, any other suitable criteria can be used to identify an attack type and/or a combination of any suitable criteria can be used to identify an attack type. In a particular example, the attack type identified at 306 can be drive-by downloads initiated through spam emails. Other examples of attack types or vectors that can be identified at 306 can include web server attacks, insider attacks, data exfiltration attacks, etc. In some embodiments, the type of attack or attack vector can be identified prior to identifying security products at 302. For example, the security products identified at 302 can be based on the type of attack or attack vector and whether the security products are capable of detecting such an attack.

In some embodiments, process 300 can link various parts of an attack together as corresponding to a single attack. For example, process 300 can link an executable file that causes a computing device to run malicious software to various other information associated with the attack. Such other information can include, for example, an email that was used to deliver a link to a URL for downloading the file. Another example of information associated with an attack can include the URL from which the file was downloaded. Yet another example of information associated with an attack can include network packets that were received in connection with the attack. Any other suitable information can be associated with an attack, in some embodiments.

In some embodiments, process 300 can cause any suitable information related to the attack to be stored in any suitable data structure. For example, process 300 can cause information related to the attack to be stored in a data structure. As another example, process 300 can cause information related to a correspondence between a particular component of the attack and a layer at which that component operates to be stored in a data structure. As yet another example, process 300 can cause information related to other components that are linked together to be stored in a data structure. Additionally or alternatively, process 300 can cause any other suitable information and/or any suitable combination of information to be stored in a data structure. In a more particular example, process 300 can cause attack data identified at 306 to be stored in a database of attack data. In some embodiments, process 300 can also cause the attack data to be associated with other information about the attack (e.g., an attack type or vector of the attack; a type of attacker associated with the attack; a time when the attack was received; any damage or costs associated with the attack; and/or any other suitable information about the attack).

In some embodiments, process 300 can use one or more honeypots to record data from an attack. Process 300 can then use the recorded attack data to test each of the identified security products. For example, the honeypot can record information related to a drive-by download attack such as the network traffic to test a network IDS, and can record an executable file or files to test a network or host-based antivirus product.

In some embodiments, process 300 can cause both attack data and/or normal data to be collected, which can be used to test the security products ability to detect attacks and/or a false positive rate of the security products. Such data can come from any suitable source of attack data and/or normal data. For example, process 300 can cause data to be collected from a commercial feed of data, or another existing honeypot. In some embodiments, process 300 can use real-time in-the-wild data to measure attacks.

In some embodiments, the honeypot used in association with process 300 can record attacks in real-time and can be used to monitor for successful attacks. Each time there is a successful attack, the honeypot can save data related to the successful attack and can link the attack components to each other in a database.

Figure 4:
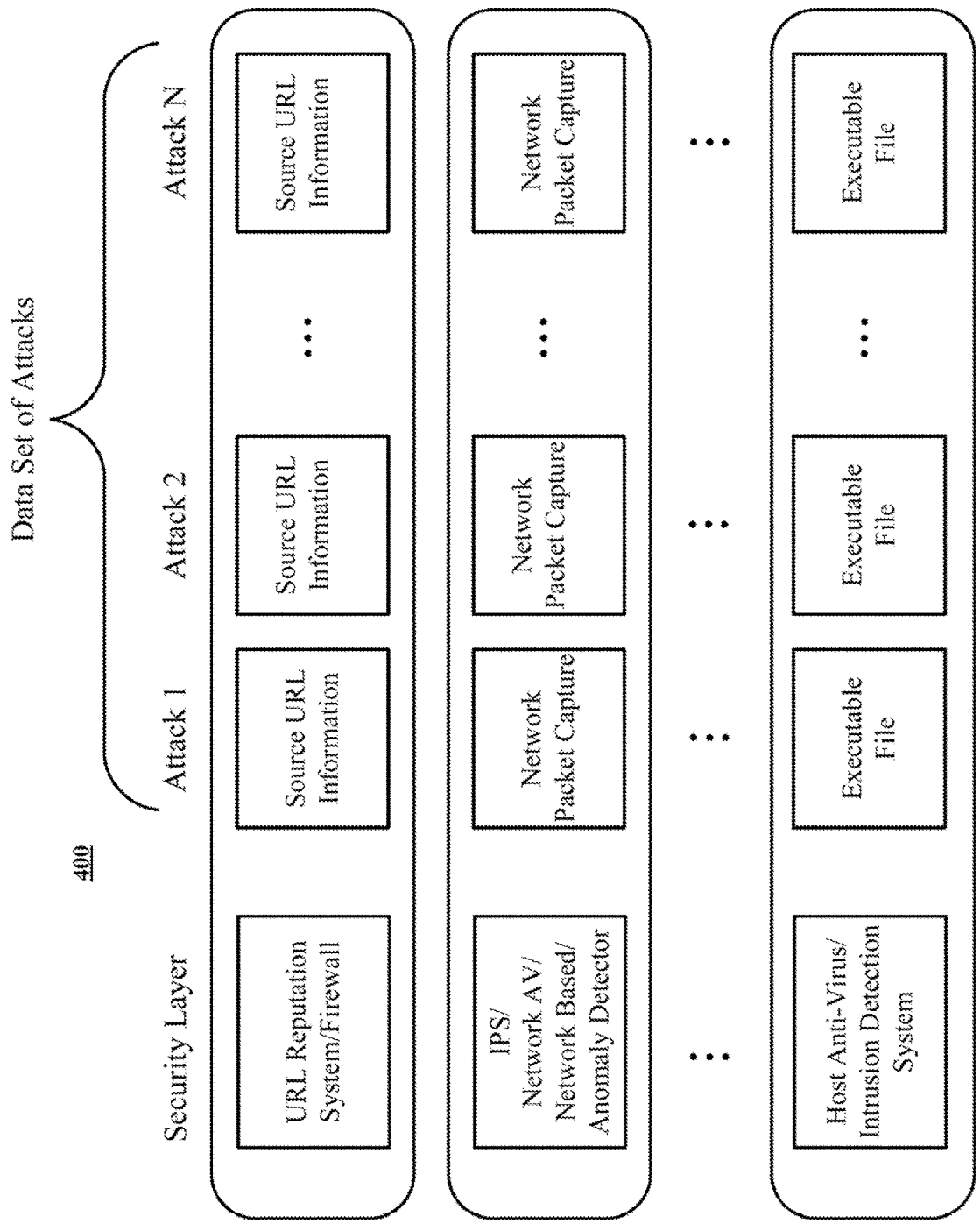
FIG. 4 shows an example of a set of attack data that is linked across different layers that correspond to different components of an attack in accordance with some embodiments of the disclosed subject matter.

FIG. 4 shows an example 400 of a set of attack data that are linked across different layers that correspond to different components of an attack. As shown in FIG. 4, components of an attack (such as attack 1, attack 2, etc.) can be identified as corresponding to different layers and/or different types of security products.

Returning to FIG. 3, at 308, process 300 can test each of the identified security products using the attack data identified at 306. In some embodiments, process 300 can cause appropriate attack data that corresponds to an identified attack to be passed to each of the security products. As described above in connection with 302, the security products can be implemented using any suitable techniques. For example, the security products can be executed by a local machine in communication with a system executing process 300. As another example, the security products can be executed by a remote device associated with a service for testing data to determine whether the data corresponds to an attack. Any other suitable techniques can be used for testing the attack data. Additionally, in some embodiments, the security products can be executed in a particular environment using a particular combination of software and/or hardware to determine whether the other software and/or hardware being used affects detection of an attack by the security products. For example, the same security products can be tested against the same attacks using different operating systems and/or different versions of an operating system.

At 310, process 300 can determine for each attack whether each of the identified security products detected the attack, at which layer the attack was detected, which component of the security product detected the attack (e.g., for security products that operate using multiple detection techniques), and/or any other suitable information about detection of the attack by the security product. In some embodiments, for each piece or pieces of data, the security product can output results indicating whether the data corresponds to an attack. In some cases, if the security product does not detect an attack (e.g., a negative result) the security product may give no indication, or may positively identify the data as being clean. On the other hand, if the security product does detect an attack (e.g., a positive result), the security product can issue an alert or warning, can log the result as corresponding to an attack, or any other suitable technique for identifying the data as corresponding to an attack. Process 300 can use this feedback in determining whether the security product detected the attack, in some embodiments. In some embodiments, process 300 can also identify a software and/or hardware setup used during the testing, to be compared with other software and/or hardware setups used in detecting the same or similar attacks.

In some embodiments, process 300 can identify any suitable data as corresponding to a single attack. Which data is identified as corresponding to a single attack by process 300 may vary depending on the attack type or vector of the attack, and/or a collection setup. For example, process 300 can consider a single attack to be when a single instance of a machine used as a honeypot (e.g., a virtual machine) visits a drive-by download web site and gets infected with an executable file. As another example, process 300 can consider a group of attacks that are grouped based on any suitable criteria to be a single attack. In a more particular example, process 300 can consider attacks stemming from a particular source email or cluster of related source emails to be a single attack. This can be done by process 300, for example, if a more stringent standard of detection is specified (e.g., by a user, by an industry standard) by only concluding that a security product detected an attack if the security product detected each attack in a group of attacks. In such an example, process 300 can cause information to be stored that can be used to indicate to a user that even if an attacker has access to a set of attack tools that can be used to launch any combination of the group of attacks, the entity would still be protected because all of the attacks were detected.

At 312, process 300 can log the results of the testing at 310 and can track each of the various security products and/or each of the attacks separately to determine which of the identified attacks each of the security products detected. In some embodiments, any suitable technique or techniques can be used to log the results at 312. For example, process 300 can cause information related to whether or not the security products identified the data as corresponding to an attack to be recorded. These results can be used to determine which attacks a particular security product is able to detect, in some embodiments (e.g., using process 100). Process 300 can cause the results for each security product to be stored in an appropriate data structure, such as a database. This data structure can be organized in any suitable way. For example, data on which attacks are detected by a particular security product can be stored in association with identifying information of the security product (e.g., in an entry for the security product). As another example, data on which security products successfully detected an attack can be stored in association with identifying information of the attack (e.g., in an entry for the attack).

Additionally or alternatively, process 300 can pass appropriate non-attack data (e.g., clean data) to the security products and can cause an indication of whether or not the security products identified the data as corresponding to an attack to be recorded. These results can be used in determining a false positive rate for a security product, in some embodiments. The results for each security product can be stored in an appropriate data structure, such as a database.

In some embodiments, process 300 can be executed for each type of attack and/or each attack vector that is to be tested. For example, in some embodiments, process 300 can be executed for attack data that includes attacks that rely on human interaction (e.g., selection of a link) to provide a more comprehensive picture of an entity's security. For example, process 300 can use an email phishing data set with information on how often users open attachments or go to websites linked in the emails associated with phishing attacks could be used in designing and/or measuring security products. Using the mechanisms described herein on this type of data set, the effectiveness of user education with regards to phishing attacks can be presented to a user in comparison to email filtering security products and the like. Additionally or alternatively, process 300 can use a data set collected to measure social engineering attacks and compare different controls and/or user education security products that are available for reducing the effectiveness of such attacks. Additionally, the mechanisms described herein can be adapted to collect data on any suitable attacks.

In some embodiments, process 300 can be used to test any suitable layers of security. For example, process 300 can be used to detect attacks by more sophisticated attackers that can require more layers of security to detect. In a more particular example, process 300 can collect data on stages of an attack after initial infection such as propagation, downloading additional malicious features, and eventually data capture and exfiltration can provide the potential for more layers of security to detect some stage of an ongoing attack. Process 300 can collect additional data corresponding to such stages of an attack and can use this additional data to test additional layers of security products, in some embodiments. For example, infected honeypots can be left online and future behavior can be observed and/or recorded by process 300 to capture generic botnet traffic without exposing sensitive data that might be compromised in an actual system. As another example, process 300 can use a more sophisticated honeypot that is run on a server with attractive, but fake, data which can be carefully monitored to test the ability to of security products designed for data loss prevention or multistage infections. This data once collected (e.g., using process 300) can also be stored in the database and used in comparing security products (e.g., using process 100).

In some embodiments, as described above, different attackers may use the same resources (e.g., exploit kits), and therefore can be defined as belonging to a particular attacker type based on the resources/capabilities they may use. In some embodiments, an approximate synthetic data set generation can be used to provide sufficient data for testing the various security products. This synthetic data can be generated automatically and/or manually (e.g., by employing programmers to develop exploits, providing bounties for identifying exploits that can be used to attack a particular entity, or any other suitable technique for generating attack data).

In some embodiments, process 300 can associate timing information about when a particular attack was detected by a particular security product with the security product and/or the attack in the database. This timing information can be used in various ways when presenting information to a user on the effectiveness of a particular security product (e.g., using process 100). For example, when determining a total detection metric, more recent detections can be weighted more heavily than less recent detections. As another example, changes in detection rate over time for different security products or sets of security products can be calculated and this information can be presented to a user using any suitable technique or techniques. As another example, a detection rate can be calculated for different periods of time for different security products or set of security products. In such examples, this information on the efficacy of a security product or set of security products that takes into account timing information can be used to indicate to a user whether a particular security product or set of security products is improving in performance over time, deteriorating in performance over time, or maintaining performance over time.

Figure 5:
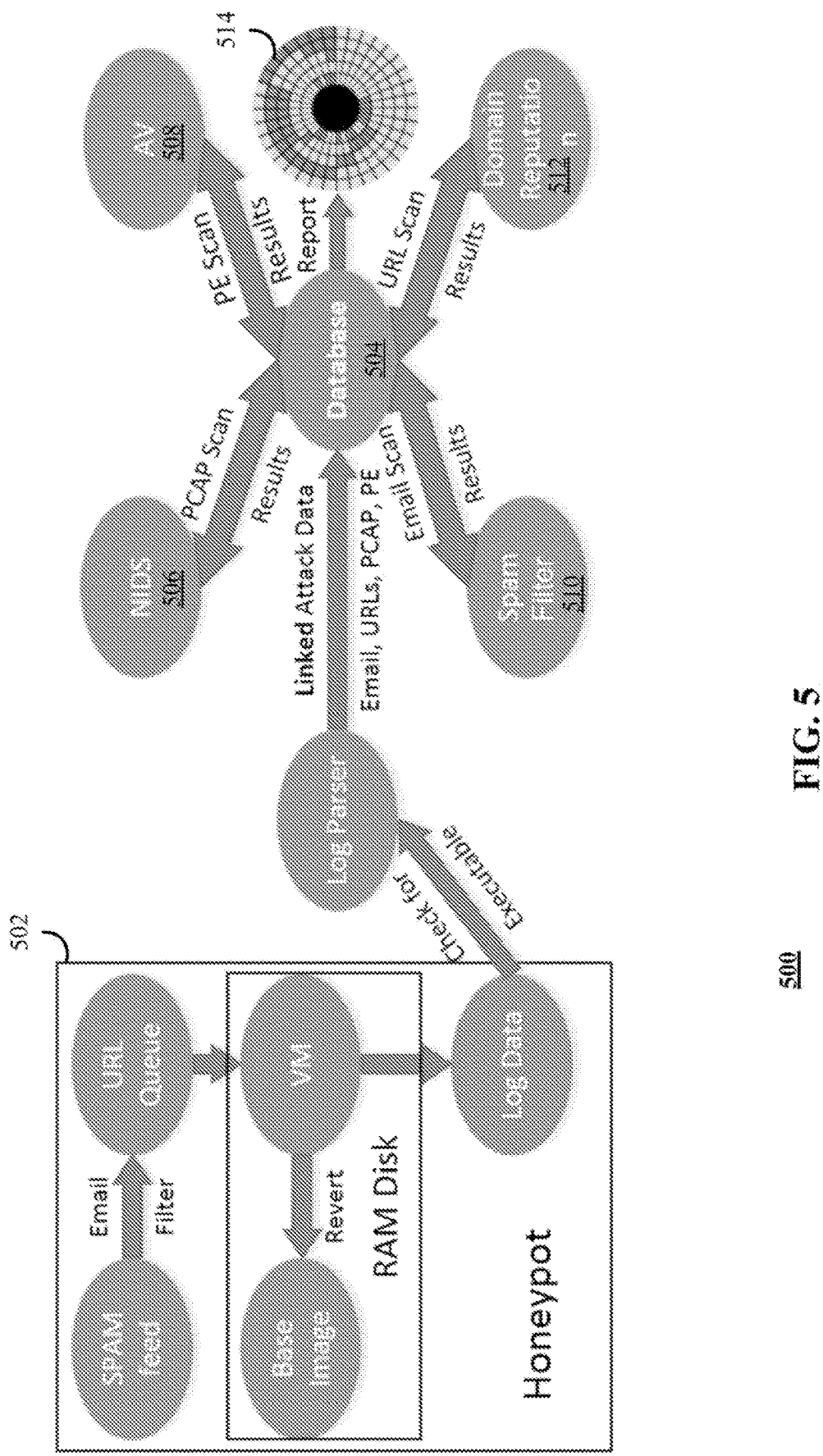
FIG. 5 shows an example of a system for executing processes described herein in accordance with some embodiments of the disclosed subject matter.

FIG. 5 shows an example 500 of a system and/or process for executing processes 100 and/or 300 in accordance with some embodiments of the disclosed subject matter. As shown in FIG. 5, system 500 can collect attack data using one or more honeypots 502, store the attack data in a database 504, and test the attack data against various security products that correspond to four layers of security 506-512. System 500 can collect real-time in-the-wild drive-by download attacks that are dispersed through widespread spam emails. Additionally, in some embodiments, another layer of security, such as human click-through rates, can also be tested using system 500 via a user study utilizing the same attack data collected by honeypot 502 to, for example, compare a believability of the spam emails to detection of the attack at other layers.

In some embodiments, process 500 can receive a real-time spam feed as a source of data. Such a spam feed can be received from a service that collects spam email using monitored email addresses, such as ABUSIX (which is associated with abusix dot com). For example, a spam feed such as spamfeed.me from ABUSIX can be used to collect attack data. Such a spam feed can forward a large volume of spam emails (e.g., on the order of one million per day). In some embodiments, system 500 can individually parse each email, and all URLs from that email can be extracted and put into a database (e.g., database 504). Similarly, attachments from each email can also be extracted and put into a database by system 500. These links and/or attachments can be queued to be visited and/or opened by honeypot 502 in any suitable order.

In some embodiments, system 500 can extract links and/or attachments from such a spam feed and these links and/or attachments can be sent to honeypot 502 which can include one or more virtual machines (e.g., running in a sandbox or other protected environment) and/or one or more computing devices. For example, honeypot 502 can be an instance of the CUCKOO SANDBOX honeypot (associated with cuckoosandbox dot org) which can drive one or more full virtual machines designed to be vulnerable to common in the wild drive-by download exploits.

In some embodiments, clusters of virtual machines (VM), with any suitable number of virtual machines (e.g., thirty, forty, one hundred) in each cluster can visit and/or open the queued URLs and/or attachments. Any suitable virtual machines can be used. For example, a cluster of virtual machines can run on top of VIRTUALBOX (associated with virtualbox dot org) across two physical machines. In some embodiments, these virtual machines can run off volatile memory, such as RAMDISK, to minimize the impact of disk IO towards running and reverting virtual machines. Additionally, in some embodiments, each cluster of virtual machines can be configured differently. For example, the clusters can be configured having variations of browsers installed and/or using variations of plugins such as JAVA, ADOBE FLASH, ADOBE ACROBAT READER. As another example, the clusters can be configured having variations of operating systems, email clients, and/or any other suitable software and/or hardware that may be used in a computing device that may be susceptible to the tested attacks. Prior to visiting a URL or opening an attachment, each cluster can be validated against a validation tool, such as CANVAS (associated with immunityinc dot com) a white hat penetration testing tool, in some embodiments, to check whether the cluster is vulnerable to existing exploits known to be targeted by exploit kits.

In some embodiments, each cluster of virtual machines can have a separate driver, which can take at least one link from the URL feed a browser of at least one of the virtual machines to visit the link. Additionally, in some embodiments, this driver can include a URL filtering mechanism that prevents the browser and/or virtual machine from issuing a network request to visit a particular URL or deleting the URL prior to execution. In some embodiments, one link from each unique second level can be queued and visited by the cluster during any given predetermined amount of time (e.g., during a 12 hour time span). In some case, if the third level domain is individually owned, multiple links from the same second level domain can be queued and visited within the predetermined period of time. Additionally, in some embodiments, each URL can be visited by multiple virtual machines and/or at multiple different times. For example, each URL can be visited three times which can compensate for possible instability of an exploit (e.g., if the exploit is poorly coded and/or relies on nondeterministic exploit conditions).

In some embodiments, each time a virtual machine visits a link, honeypot 502 can generate a log that contains a packet capture (pcap) file of the network traffic that was generated after visiting the link, and can record some details of the execution of programs in the operating system as well as new files generated. Additionally, in some embodiments, a background application can scan log files to determine if any executable files have been generated. The appearance of a new executable file can indicate that an attack successfully occurred and can provide a level of confidence of malicious behavior. In some embodiments, such a detection can be assumed to have a zero false positive rate.

In some embodiments, the new executable file can be identified as malicious by at least one of the antivirus products tested. If a new executable is found, process 500 can flag the executable as corresponding to an attack and the executable file or files can be stored, as well as the email, pcap file, and the URLs visited during that attack into database 504. These different pieces of data can all be sent to database 504, and can be linked based on information from a parser that correlates the different pieces of data. System 500 can link these different pieces of data (such as an HTTP link that led to a particular Windows PE file loaded onto a victim machine) in order to compare the ability of different security products effectiveness in detecting the attack. For example, system 500 can link the data to later compare the effectiveness of a domain reputation system (such as GOOGLE SAFEWEB) to be compared to the effectiveness of a host or network based antivirus product. When analyzing a particular entity's security (e.g., using process 100), the attack can be identified as being detected if both security products are specified security products and if either security product successfully identified the attack. In some embodiments, system 500 can link the various pieces of data after an attack is determined to have occurred in order to confirm that the data correspond to an attack, rather than linking the various data inline.

In some embodiments, system 500 can use host-based antivirus software programs (e.g., AV 508) to scan any newly created file or files within a short time (e.g., thirty seconds, a minute, etc.) after the file has been logged and/or stored in database 504. In some embodiments, system 500 can use AV 508 to rescan the files after a predetermined amount of time has passed (e.g., every six hours, every eight hours, etc.) to test if new updates to the antivirus program are capable of detecting the attack. Each installed antivirus program can be caused to be updated regularly. Additionally or alternatively, system 500 can send the executable files to a service that scans the files against one or more available antivirus produces, such as VIRUSTOTAL (associated with virustotal dot com) periodically (e.g., every thirty minutes, every hour, every twelve hours, etc.).

In some embodiments, in addition to scanning the executable files the logged and linked email and network packets (e.g., pcap) associated with the attacks can be tested by system 500. For example, system 500 can use a spam filter 510, such as SPAM ASSASSIN (associated with spamassassin dot apache dot org), to test the email and can use a network IDS 506, such as Snort (associated with snort dot org), to test the network packets. In some embodiments, system 500 can also use the spam filter and network IDS to test the attack data within a short time (e.g., thirty seconds, a minute, etc.) after it is stored in the database, and can retest the data after a predetermined amount of time has passed (e.g., every six hours, every eight hours, etc.) to determine if updates of the mechanisms are capable of detecting the attack.

In some embodiments, system 500 can test a URL associated with the attack. For example, system 500 can use a domain reputation system 512 to detect whether the URL is associated with an attack. For example, system 500 can use data from various domain blacklists to test each link that is associated with an attack to determine if the domain is flagged as malicious. In some embodiments, whenever there is any result from domain reputation system 512, system 500 can cause the particular blacklist or other domain reputation system that detected the attack to be identified as having identified the attack. Additionally, in some embodiments, system 500 can use the domain reputation system to test the attack data within a short time (e.g., thirty seconds, a minute, etc.) after it is stored in the database, and to retest the data after a predetermined amount of time has passed (e.g., every six hours, every eight hours, etc.) to determine if updates of the domain reputation systems are capable of detecting the attack.

In some embodiments, system 500 can test the efficacy of various security education programs for users by sending emails associated with attacks to users and determine a rate at which the educated users visit the links in the emails or open an attachment associated with the emails. Additionally, system 500 can also send the emails to a control group that did not receive the security education, and can use the rate at which those users visit the links or as a basis for comparison. In some embodiments, testing users can include adding a unique identifier an email associated with an attack and changing a malicious link to point to a benign web server with an unaffiliated domain name, or changing an attachment to be a readme file (or other suitable file type) with a non-malicious contents. The selected user emails can be selected using any suitable techniques. In some embodiments, the emails can be sent from a clean account with an old non-malicious domain for the links to evade reputation based spam filters, but content based spam filters may still affect the results. If a user visits the unique link, system 500 can record the information as a click through and a webpage can be displayed to the user indicating that the user visited a formerly malicious URL and/or a warning of the dangers of clicking unknown links.

In some embodiments, information can be output by system 500 as a report 514 or various reports, which can be generated based on the attack data in database 504 in response to one or more database queries. For example, report 514 or reports can be output in response to a process, such as process 100, which specifies various security products for which results are to be reported.

Although the examples described herein are generally directed to detecting drive-by-download attacks, this is merely an illustrative example and the mechanisms described herein can be used for testing any suitable type of attack. For example, the mechanisms described herein can test security products against web application attacks such as SQL injection attacks, buffer overflow attacks, or any other suitable type of web application attack. In such an example, the web application attack can be launched against a device (e.g., a honeypot, a server hosting a web page, or any other suitable device) and different data from the web application attack can be collected, such as network traffic associated with the attack, system calls initiated based on the attack, file accesses initiated based on the attack, database queries initiated based on the attack, or any other suitable data. This collected data can then be used to test various security products, such as network-based IDS products, web content anomaly detectors, database security products, or any other suitable security product that detects web application attacks. The results of the testing can then be stored (e.g., in accordance with process 300 and/or the processes associated with the system of FIG. 5) and can be used to generate a detection rate associated with web based attacks (e.g., in accordance with process 100).

Figure 6:
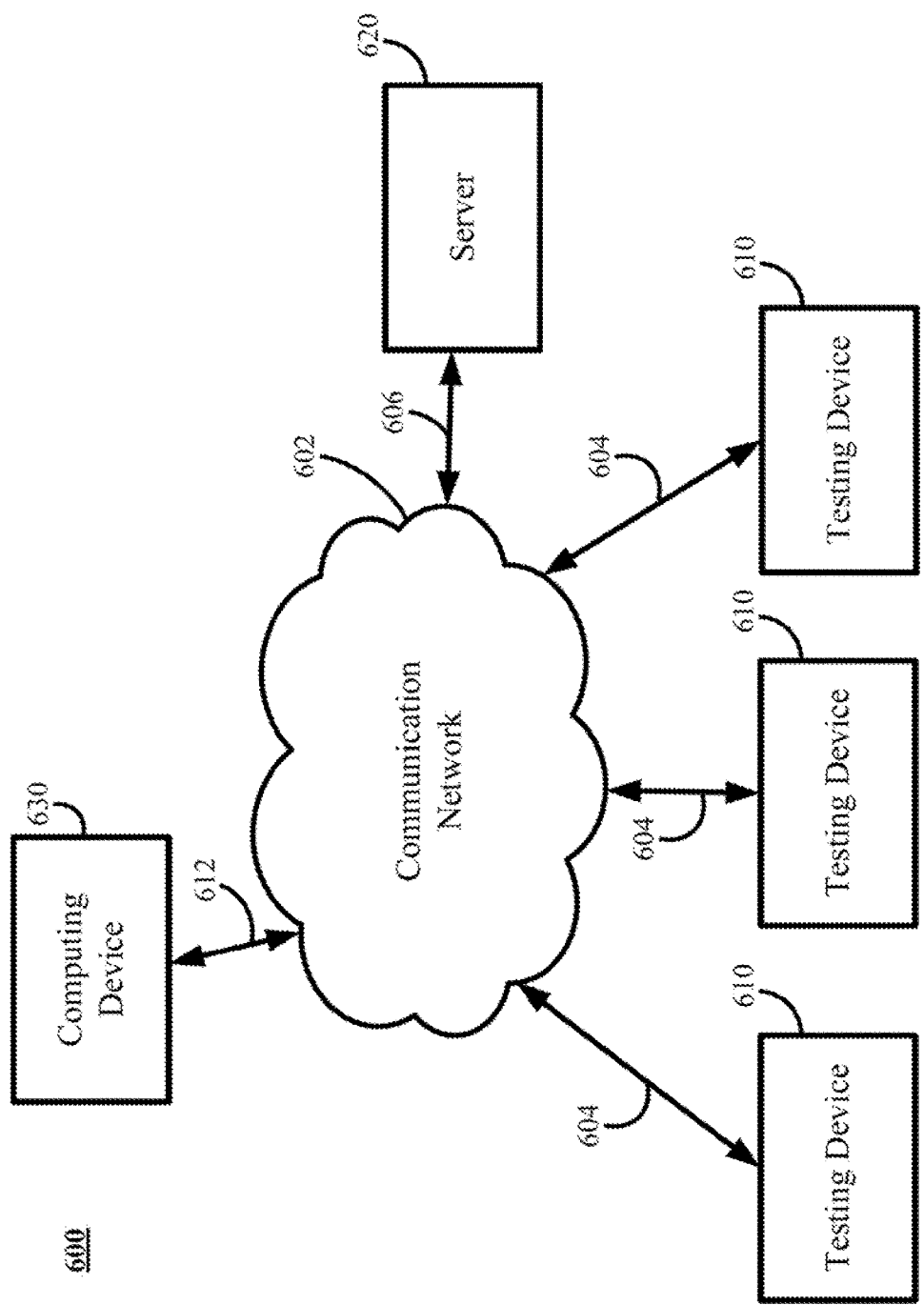
FIG. 6 shows an example of a schematic diagram of a system suitable for implementation of mechanisms described herein for evaluating layered computer security products in accordance with some embodiments of the disclosed subject matter.

FIG. 6 shows an example 600 of a generalized schematic diagram of a system on which the mechanisms for evaluating layered security products as described herein can be implemented in accordance with some embodiments. As illustrated, system 600 can include one or more testing devices 610. Testing devices 610 can be local to each other or remote from each other. Testing devices 610 can be connected by one or more communications links 604 to a communications network 602 that can be linked via a communications link 606 to one or more servers 620, and testing device 610 and/or server 620 can be linked via a communication link 612 to one or more computing devices 630.

In some embodiments, each of testing devices 610, server 620, and computing device 630 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, testing device 610 can be implemented as a virtual machine running on a computing device such as a personal computer or server, as a personal computer, as a server, as a laptop computer, or any other suitable computing device. In some embodiments, testing device 610 can be used to identify attacks and/or test attack data (or clean data) as described in connection with, for example, FIGS. 3 and 5. In some embodiments, testing device 610 can include particular hardware associated with one or more security products to be tested such as a special purpose appliance associated with a particular security product which may include any suitable hardware.

Communications network 602 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 604, 606 and 612 can be any communications links suitable for communicating data among testing devices 610, servers 620, and computing device 630, such as network links, dial-up links, wireless links, hard-wired links, optical links, infrared links, any other suitable communications links, or any suitable combination of such links.

System 600 can include one or more servers 620 that can receive attack data from testing devices 610, store linked attack data (e.g., in a database such as database 504), cause at least a portion of the linked attack data to be tested by appropriate security products, receive identifying information from computing device 630 that specifies particular security products, analyze the specified security products, cause results of such analysis to be presented to a user of computing device 630, and/or perform any other suitable actions. In some embodiments, server 620 can run process 100 and/or process 300, coordinate the actions of testing devices 610 and/or system 500, and/or perform any other suitable actions. In some embodiments, different functions can be performed by multiple servers 620 and/or multiple servers can perform similar actions. Although server 620 is described herein as being one or more servers, server 620 can be any suitable computing device, such as a personal computer, a laptop computer, a smartphone, a tablet computer, a wearable computer, a game console, and/or any other suitable computing device.

System 600 can include one or more computing devices 630 that present a user interface to a user (e.g., as described above in connection with FIG. 1), receive input from a user specifying particular security products, and/or perform any other suitable actions. Computing device 630 can be any suitable computing device, such as a personal computer, a laptop computer, a server, a smartphone, a tablet computer, a wearable computer, a game console, and/or any other suitable computing device.

Figure 7:
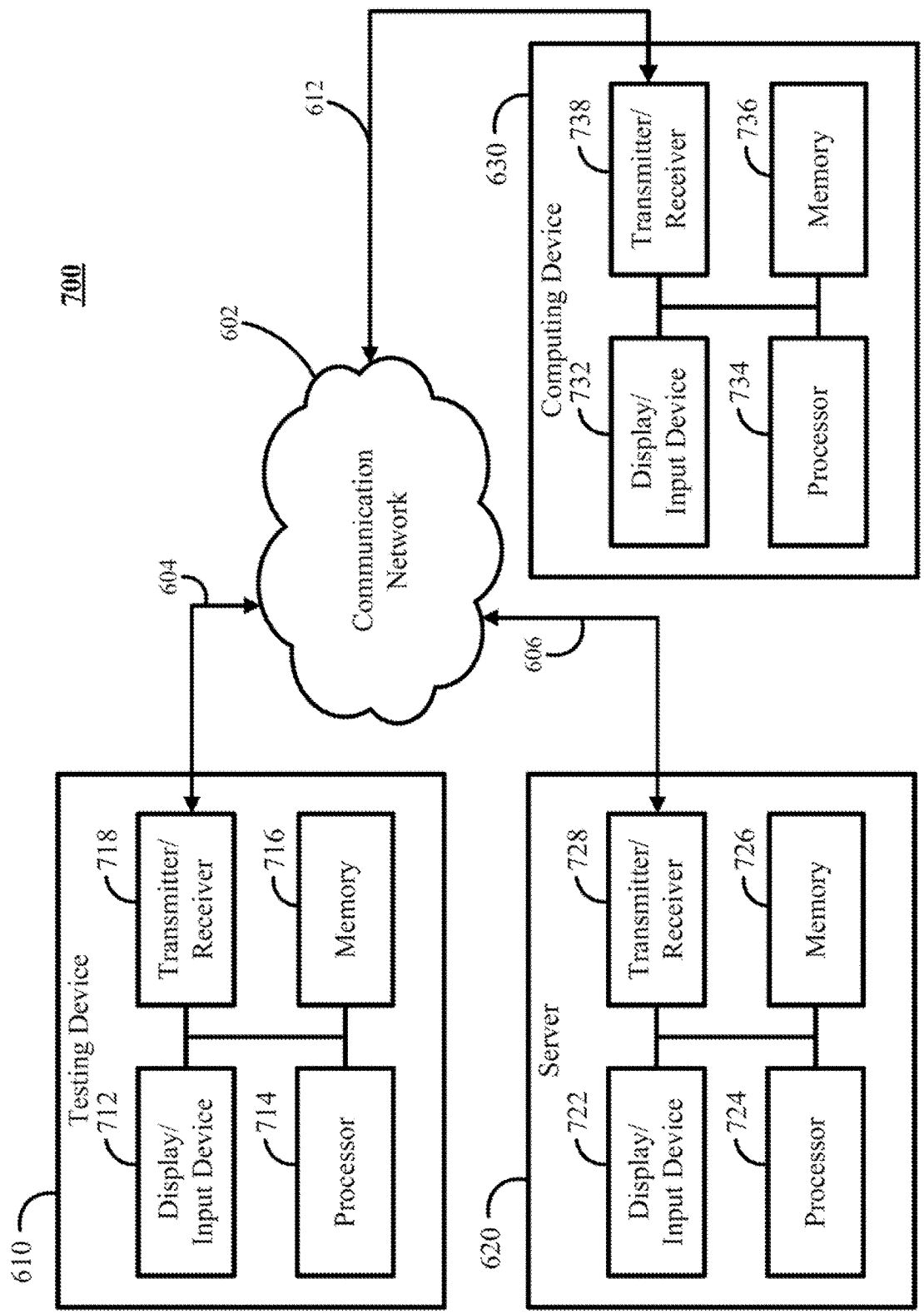
FIG. 7 shows an example of testing device, a server, and/or a computing device of FIG. 6 that can be used in accordance with some embodiments of the disclosed subject matter.

FIG. 7 illustrates an example 700 of hardware that can be used to implement one of testing devices 610, server 620, and computing device 630 depicted in FIG. 6 in accordance with some embodiments of the disclosed subject matter. Referring to FIG. 7, testing device 610 can include a display/input device 712, a hardware processor 714, memory 716, and a transmitter/receiver 718, which can be interconnected. In some embodiments, memory 716 can include a storage device (such as a non-transitory computer-readable medium) for storing a computer program for controlling hardware processor 712.

Hardware processor 714 can use the computer program to present on display/input device 712 a user interface for presenting various visual information to a user, such as visual output of an operating system, user interface, and/or other applications being executed by testing device 610, as well as any other suitable visual information. It should also be noted that data received through communications link 604 or any other communications links can be received from any suitable source. In some embodiments, hardware processor 714 can send and receive data through communications link 604 or any other communication links using, for example, a transmitter, receiver, transmitter/receiver, transceiver, or any other suitable communication device, such as transmitter/receiver 718. Display/input device 712 can include a touchscreen (e.g., touchscreen 302), a flat panel display, a projector, a cathode ray tube display, a video output port, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 718 can include any suitable transmitter and/or receiver for transmitting and/or receiving, among other things, data such as emails or other sources of possible attacks, instructions from server 620, etc.

Server 620 can include a display/input device 722, a hardware processor 724, memory 726, and a transmitter/receiver 728, which can be interconnected. In some embodiments, memory 726 can include a storage device (such as a non-transitory computer-readable medium) for storing a server program for controlling hardware processor 724.

Hardware processor 724 can use the server program to communicate with testing devices 610 to, for example, receive attack data, receive information related to attacks, send attack data to be tested, etc., to communicate with computing device 630 to, for example, receive information identifying specified security products, cause information to be presented to a user of computing device 630, such as information related to the effectiveness of the specified security products, the effectiveness of additional security products, etc. It should also be noted that data received through communications link 606 or any other communications links can be received from any suitable source. In some embodiments, hardware processor 724 can send and receive data through communications link 606 or any other communication links using, for example, a transmitter, receiver, transmitter/receiver, transceiver, or any other suitable communication device, such as transmitter/receiver 728. Display/input device 722 can include a touchscreen, a flat panel display, a projector, a cathode ray tube display, a video output port, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 728 can include any suitable transmitter and/or receiver for transmitting and/or receiving, among other things, attack data to testing devices 610, information related to specified and/or additional security products to computing device 630, etc.

Computing device 630 can include a display/input device 732, a hardware processor 734, memory 736, and a transmitter/receiver 738, which can be interconnected. In some embodiments, memory 736 can include a storage device (such as a non-transitory computer-readable medium) for storing a computer program for controlling hardware processor 734.

Hardware processor 734 can use the computer program to communicate with server 620 and/or testing devices 610 to specify security products, receive information related to the effectiveness of the specified security products, receive information related to the effectiveness of additional security products, etc., as well as to perform any other suitable functions. It should also be noted that data received through communications link 612 or any other communications links can be received from any suitable source. In some embodiments, hardware processor 734 can send and receive data through communications link 612 or any other communication links using, for example, a transmitter, receiver, transmitter/receiver, transceiver, or any other suitable communication device, such as transmitter/receiver 738. Display/input device 732 can include a touchscreen, a flat panel display, a projector, a cathode ray tube display, a video output port, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 738 can include any suitable transmitter and/or receiver for transmitting and/or receiving, among other things, information specifying particular security products, information related to the effectives of the specified security products, information related to the effectiveness of addition security products, etc.

In some embodiments, the mechanisms described herein can include server-side software, client-side software, server-side hardware, client-side hardware, firmware, or any suitable combination thereof. For example, these mechanisms can encompass one or more Web pages or Web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor to execute the mechanisms described herein. For instance, these mechanisms can encompass a computer program written in a programming language recognizable by testing device 610, server 620 and/or computing device 630 that is executing the mechanisms (e.g., a program written in a programming language, such as, Java, C, Objective-C, C++, C#, JavaScript, Visual Basic, HTML, XML, ColdFusion, any other suitable approaches, or any suitable combination thereof).

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In some embodiments of the disclosed subject matter, the above described steps of the processes of FIGS. 1, 3 and 5 can be executed or performed in any order or sequence not limited to the order and sequence shown and described in the figures. Also, some of the above steps of the processes of FIGS. 1, 3 and 5 can be executed or performed substantially simultaneously where appropriate or in parallel to reduce latency and processing times. Furthermore, it should be noted that FIGS. 1, 3 and 5 are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

It should be noted that, as used herein, the term mechanism can encompass hardware, software, firmware, or any suitable combination thereof.

Accordingly, methods, systems, and media for evaluating layers of computer security products are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for evaluating layered security products, the method comprising:
   (a) recording attacks on a honey pot in real-time, identify a successful one of the attacks as a known attack, and save attack data associated with the known attack;
   (b) identifying, using at least one hardware processor, a plurality of portions of the attack data associated with the known attack, wherein at least one of the plurality of portions of attack data is at least a portion of an executable file delivered by the known attack;
   (c) testing, using the at least one hardware processor, a plurality of security products using the plurality of portions of attack data of the known attack, wherein at least two of the security products use different portions of the plurality of portions of attack data to detect the attack and at least one of the different portions of the plurality of portions of attack data is the at least a portion of the executable file;
   (d) storing, using the at least one hardware processor, results of the testing in association with information identifying the known attack;
   (e) repeating, using the at least one hardware processor, (c) and (d) for a plurality of known attacks;
   receiving, using the at least one hardware processor, information identifying a subset of the plurality of security products from a remote computing device;
   identifying, using the at least one hardware processor, for each of the subset of the plurality of security products, a first set of identified known attacks detected by the security product from the plurality of tested known attacks using the stored results; and
   determining, using the at least one hardware processor, a number of the identified known attacks in a union of each of the first sets of identified known attacks.

2. The method of claim 1, further comprising:
   identifying, using the at least one hardware processor, at least one additional security product not included in the subset of the plurality of security products and that detected at least one attack of the plurality of tested attacks that is not included in any of the first sets of identified known attacks;
   identifying, using the at least one hardware processor, for the at least one additional security product, a second set of attacks detected by the at least one additional security product from the plurality of tested attacks;
   determining, using the at least one hardware processor, a second number of attacks in a second union of each of the first union of identified attacks and the second set of identified attacks;
   determining, using the at least one hardware processor, an updated detection rate for the subset of the plurality of security products and the at least one additional security product by comparing the second number of attacks to the number of attacks in the plurality of tested attacks; and
   causing, using the at least one hardware processor, the updated detection rate to be presented on the display.

3. The method of claim 2, further comprising ranking, using the at least one hardware processor, the plurality of additional security products, including the at least one additional security product, based at least in part on a number of attacks in a union of attacks detected by each of the plurality of additional security products and attacks in the first union.

4. The method of claim 3, further comprising causing, using the at least one hardware processor, at least one of the plurality of additional security products to be presented in an order determined based on the ranking.

5. The method of claim 2, further comprising:
   receiving, using the hardware processor, a budget from the remote computing device; and
   wherein identifying the at least one additional security product is based on an estimated cost of the at least one addition security product and the budget.

6. The method of claim 1, further comprising causing, using the at least one hardware processor, a graphical representation of attacks from the plurality of tested attacks detected by each of the subset of the plurality of security products to be presented on the display coupled to the remote computing device.

7. The method of claim 1, further comprising determining, using the hardware processor, attacks from the plurality of tested attacks detected by at least two of the subset of the plurality of security products.

8. The method of claim 1, wherein identifying a first set of attacks detected by the security product comprises:
   querying, using the hardware processor, a database of tested attack data for each of the subset of the plurality of security products, wherein the database includes the stored results; and
   receiving, using the hardware processor, the first set of attacks detected by each of the subset of the plurality of security products in response to the query.

9. A system for evaluating layered security products, the system comprising:
   at least one hardware processor programmed to:
   (a) record attacks on a honey pot in real-time, identify a successful one of the attacks as a known attack, and save attack data associated with the known attack;
   (b) identify a plurality of portions of the attack data associated with the known attack, wherein at least one of the plurality of portions of attack data is at least a portion of an executable file delivered by the known attack;
   (c) test a plurality of security products using the plurality of portions of attack data of the known attack, wherein at least two of the security products use different portions of the plurality of portions of attack data to detect the attack and at least one of the different portions of the plurality of portions of attack data is the at least a portion of the executable file;
   (d) store results of the testing in association with information identifying the known attack;
   (e) repeat (c) and (d) for a plurality of known attacks;
   receive information identifying a subset of the plurality of security products from a remote computing device;
   identify for each of the subset of the plurality of security products, a first set of identified known attacks detected by the security product from the plurality of tested known attacks using the stored results;
   determine a number of the identified known attacks in a union of each of the first sets of identified known attacks.

10. The system of claim 9, wherein the at least one hardware processor is further programmed to:
    identify at least one additional security product not included in the subset of the plurality of security products and that detected at least one attack of the plurality of tested attacks that is not included in any of the first sets of identified known attacks;

identify for the at least one additional security product, a second set of attacks detected by the at least one additional security product from the plurality of tested attacks;

determine a second number of attacks in a second union of each of the first union of identified attacks and the second set of identified attacks;

determine an updated detection rate for the subset of the plurality of security products and the at least one additional security product by comparing the second number of attacks to the number of attacks in the plurality of tested attacks; and cause the updated detection rate to be presented on the display.

11. The system of claim 10, wherein the at least one hardware processor is further programmed to rank the plurality of additional security products, including the at least one additional security product, based at least in part on a number of attacks in a union of attacks detected by each of the plurality of additional security products and attacks in the first union.

12. The system of claim 11, wherein the at least one hardware processor is further programmed to cause at least one of the plurality of additional security products to be presented in an order determined based on the ranking.

13. The system of claim 10, the at least one hardware processor is further programmed to:
receive a budget from the remote computing device; and
identify the at least one additional security product based on an estimated cost of the at least one addition security product and the budget.

14. The system of claim 9, wherein the at least one hardware processor is further programmed to cause a graphical representation of attacks from the plurality of tested attacks detected by each of the subset of the plurality of security products to be presented on the display coupled to the remote computing device.

15. The system of claim 9, wherein the at least one hardware processor is further programmed to determine attacks from the plurality of tested attacks detected by at least two of the subset of the plurality of security products.

16. The system of claim 9, wherein the at least one hardware processor is further programmed to:
query a database of tested attack data for each of the subset of the plurality of security products, wherein the database includes the stored results; and
receive the first set of attacks detected by each of the subset of the plurality of security products in response to the query.

17. A non-transitory computer-readable medium containing computer executable instructions that, when executed by a processor, cause the processor to perform a method for evaluating layered security products, the method comprising:
(a) recording attacks on a honey pot in real-time, identify a successful one of the attacks as a known attack, and save attack data associated with the known attack;
(b) identifying a plurality of portions of the attack data associated with the known attack, wherein at least one of the plurality of portions of attack data is at least a portion of an executable file delivered by the known attack;
(c) testing a plurality of security products using the plurality of portions of attack data of the known attack, wherein at least two of the security products use different portions of the plurality of portions of attack data to detect the attack and at least one of the different portions of the plurality of portions of attack data is the at least a portion of the executable file;
(d) storing results of the testing in association with information identifying the known attack;
(e) repeating (c) and (d) for a plurality of known attacks;
receiving information identifying a subset of the plurality of security products from a remote computing device;
identifying for each of the subset of the plurality of security products, a first set of identified known attacks detected by the security product from the plurality of tested known attacks using the stored results; and
determining a number of the identified known attacks in a union of each of the first sets of identified known attacks.

18. The non-transitory computer-readable medium of claim 17, wherein the method further comprises:
identifying at least one additional security product not included in the subset of the plurality of security products and that detected at least one attack of the plurality of tested attacks that is not included in any of the first sets of identified known attacks;
identifying for the at least one additional security product, a second set of attacks detected by the at least one additional security product from the plurality of tested attacks;
determining a second number of attacks in a second union of each of the first union of identified attacks and the second set of identified attacks;
determining an updated detection rate for the subset of the plurality of security products and the at least one additional security product by comparing the second number of attacks to the number of attacks in the plurality of tested attacks; and
causing the updated detection rate to be presented on the display.

19. The non-transitory computer-readable medium of claim 18, wherein the method further comprises ranking the plurality of additional security products, including the at least one additional security product, based at least in part on a number of attacks in a union of attacks detected by each of the plurality of additional security products and attacks in the first union.

20. The non-transitory computer-readable medium of claim 19, wherein the method further comprises causing at least one of the plurality of additional security products to be presented in an order determined based on the ranking.

21. The non-transitory computer-readable medium of claim 18, wherein the method further comprises:
receiving a budget from the remote computing device; and
wherein identifying the at least one additional security product is based on an estimated cost of the at least one addition security product and the budget.

22. The non-transitory computer-readable medium of claim 17, wherein the method further comprises causing a graphical representation of attacks from the plurality of tested attacks detected by each of the subset of the plurality of security products to be presented on the display coupled to the remote computing device.

23. The non-transitory computer-readable medium of claim 17, wherein the method further comprises determining attacks from the plurality of tested attacks detected by at least two of the subset of the plurality of security products.

24. The non-transitory computer-readable medium of claim 17, wherein identifying a first set of attacks detected by the security product comprises:

querying a database of tested attack data for each of the subset of the plurality of security products, wherein the database includes the stored results; and receiving the first set of attacks detected by each of the subset of the plurality of security products in response to the query.

* * * * *